(12) United States Patent
Wolkerstorfer

(10) Patent No.: US 8,708,637 B2
(45) Date of Patent: Apr. 29, 2014

(54) CONSIGNMENT SYSTEM AND METHOD OF LOADING A FREIGHT CARRIER

(75) Inventor: Christoph Wolkerstorfer, Wels (AT)

(73) Assignee: TGW Mechanics GmbH, Wels (AT)

( * ) Notice: Subject to any disclaimer, the term of this patent is extended or adjusted under 35 U.S.C. 154(b) by 871 days.

(21) Appl. No.: 12/735,333

(22) PCT Filed: Jan. 27, 2009

(86) PCT No.: PCT/AT2009/000027
§ 371 (c)(1),
(2), (4) Date: Jul. 6, 2010

(87) PCT Pub. No.: WO2009/094681
PCT Pub. Date: Aug. 6, 2009

(65) Prior Publication Data
US 2010/0278625 A1    Nov. 4, 2010

(30) Foreign Application Priority Data

Jan. 28, 2008   (AT) .................................. A 127/2008
Oct. 1, 2008    (AT) ................................. A 1533/2008

(51) Int. Cl.
*B65G 57/11*    (2006.01)
*B65G 57/22*    (2006.01)

(52) U.S. Cl.
USPC .................... 414/799; 414/791.6; 414/793.5; 198/614

(58) Field of Classification Search
USPC ............ 198/588, 589, 812, 817; 271/191, 67; 414/278, 398, 527, 792.7, 792.8, 414/793.1, 793.3, 793.4, 793.5, 793.6, 414/793.7, 793.8, 794, 794.4, 794.5, 794.7, 414/794.8, 796.5, 799
See application file for complete search history.

(56) References Cited

U.S. PATENT DOCUMENTS

| 3,416,674 | A | * | 12/1968 | Gualandris et al. | ........... 414/792 |
| 3,567,047 | A | * | 3/1971 | Clausen et al. | ............... 271/176 |
| 4,014,430 | A | * | 3/1977 | Beaty et al. | ................... 198/588 |
| 4,027,805 | A | * | 6/1977 | Beumer et al. | ............. 414/791.6 |
| 4,681,501 | A | * | 7/1987 | Edwards et al. | ........... 414/789.5 |

(Continued)

FOREIGN PATENT DOCUMENTS

| DE | 30 17 612 | 11/1981 |
| EP | 0 799 780 | 10/1997 |

(Continued)

OTHER PUBLICATIONS

International Search Report.

*Primary Examiner* — Gregory Adams
(74) *Attorney, Agent, or Firm* — Collard & Roe, P.C.

(57) ABSTRACT

The invention relates to a consignment system and method for loading a freight carrier (2) with freight units (4) forming a freight stack (3), either manually or on an automated basis. The consignment system comprises a device (1) with a positioning conveyor unit (16) which has conveyor tracks (50*a*, 50*b*) which can be adjusted by means of a displacement device (52) to a distance (53) determined on the basis of the conveying property of the freight unit (4) to be stacked and/or from a gap width (81) of a stack gap in a stack position of the freight stack (3).

23 Claims, 12 Drawing Sheets

(56) References Cited

U.S. PATENT DOCUMENTS

| | | | |
|---|---|---|---|
| 5,201,626 A * | 4/1993 | Hansen | 414/398 |
| 5,383,760 A * | 1/1995 | Cawley et al. | 414/791.6 |
| 5,803,706 A * | 9/1998 | Achelpohl | 414/794.4 |
| 5,823,316 A | 10/1998 | Shaw et al. | |
| 5,944,479 A * | 8/1999 | Kanaya et al. | 414/791.6 |
| 6,012,568 A * | 1/2000 | Kane | 198/817 |
| 7,047,710 B2 | 5/2006 | Winkler | |
| 7,695,235 B1 * | 4/2010 | Rallis | 414/400 |
| 2007/0280812 A1 | 12/2007 | Morency et al. | |

FOREIGN PATENT DOCUMENTS

| | | | | |
|---|---|---|---|---|
| EP | 1 462 394 | | 9/2004 | |
| JP | 7-2360 A | | 1/1995 | |
| JP | 07157085 A | * | 6/1995 | ........... B65G 57/112 |
| JP | 07-267366 | | 10/1995 | |
| JP | 11-020945 | | 1/1999 | |
| JP | 2000-118717 A | | 4/2000 | |
| JP | 2000128354 A | * | 5/2000 | ............. B65G 57/11 |
| JP | 2002316718 A | * | 10/2002 | ............. B65G 57/11 |
| NL | 1 023 904 | | 1/2005 | |
| WO | WO 03/078282 | | 9/2003 | |

* cited by examiner

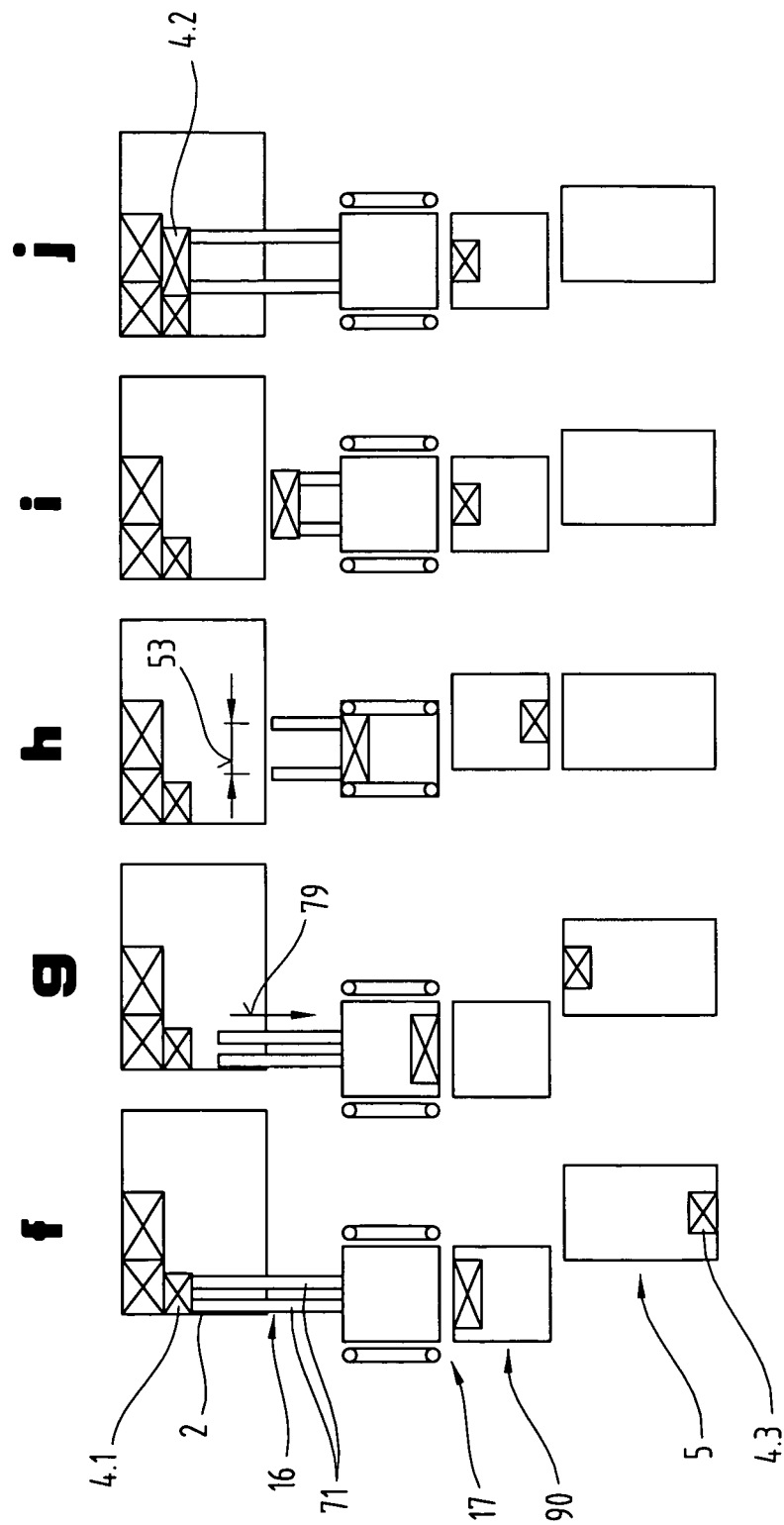

CONSIGNMENT SYSTEM AND METHOD OF LOADING A FREIGHT CARRIER

CROSS REFERENCE TO RELATED APPLICATIONS

This application is the National Stage of PCT/AT2009/000027 filed on Jan. 27, 2009, which claims priority under 35 U.S.C. §119 of Austrian Application No. A 127/2008 filed on Jan. 28, 2008 and Austrian Application No. A 1533/2008 filed on Oct. 1, 2008. The international application under PCT article 21(2) was not published in English.

The invention relates to a consignment system and a method of loading a freight carrier, in particular a pallet, with freight units forming a freight stack, either manually or on an automated basis.

A device for loading a freight carrier with freight units forming a freight stack on an automated basis is disclosed in patent specification EP 1 462 394 B1, which comprises a feeding system, a stationary loading platform, a charging conveyor unit for pushing a freight unit onto and relative to the stationary loading platform horizontally in one direction (x direction) along the freight carrier and a positioning conveyor unit for taking hold of a freight unit on the loading platform and moving the freight unit in the direction of the loading depth of the freight carrier (z direction), as well as a wiper disposed above the positioning conveyor unit which can be moved in the in the z direction independently of the positioning conveyor unit and is used to hold the freight unit in the desired position on the freight stack. The freight carrier is loaded in on the basis of a spatial loading configuration of the freight units in the freight stack which is optimised to suit stability and/or capacity usage. A loading sequence is determined from the loading configuration, on the basis of which the freight units are separately conveyed to the stationary loading platform, where an individual freight unit is moved by the charging conveyor unit in the x direction to the pre-specified x position of the freight unit in the loading configuration of the freight stack. The freight unit is then pushed by means of the wiper to the positioning conveyor unit projecting in the z direction and is moved by the latter in the z direction to the pre-specified z position in the loading configuration of the freight stack. The positioning conveyor unit is then moved back whilst the wiper initially remains in its position so that the freight unit is deposited on the freight stack in the z position previously specified for it. The positioning conveyor unit and the wiper are then moved back. A freight unit is positioned in the freight stack in the y direction by lifting and lowering the freight carrier.

Patent specification JP 11-020945 A discloses a device for the automated loading of freight units onto a freight carrier supported on a lifting table, which has a positioning conveyor unit which can be moved in one direction (x direction) horizontally alongside the freight carrier by means of a first displacement device and in the direction of the loading depth of the freight carrier (z direction) by means of a second displacement device, provided in the form of belt conveyors. Adjoining the positioning conveyor unit is a conveyor unit, the downstream end of which can be moved in the x and z directions.

The known devices for loading a freight carrier on an automated basis use a positioning conveyor unit with a fixed width on the multi-sided spectrum of the freight units. The width is adapted to the freight unit of the biggest dimensions, which means that any gap in a stacking position between adjacent freight units already stacked on the freight carrier or between a freight unit and a wall part of a stacking aid can not be made use of if the width of the positioning conveyor unit is bigger than a gap width. Due to the gaps left between the freight units or in the peripheral region of the freight stack, capacity usage in the freight stack can be optimised to a limited degree only.

Also known from the prior art are consignment systems whereby freight units are manually stacked on a freight carrier. The freight units are separately placed on a positioning conveyor unit, picked up by a member of the consignment staff and stacked on the freight carrier in appropriate loading positions. This results in ergonomically unfavourable conditions for the consignment staff because no allowance is made for accessibility and ability to take hold of the freight units.

The objective of the invention is to propose a device and a method for loading a freight carrier with freight units, manually or on an automated basis, which can be more efficiently operated than is the case in the prior art, even if using freight units with a range of different properties, such as dimensions, suitability and such like.

The objective is achieved by the characteristics and features according to one aspect of the invention. The advantage is that by adjusting the distance between the conveyor tracks, the freight units can be reliably supported as they are moved until they arrive at the loading position on the freight stack. If long freight units have to be stacked, the conveyor tracks are moved so far apart that a freight unit is reliably supported on the conveyor tracks and does not slip between them. If, on the other hand, the freight units which have to be stacked are slim, the conveyor tracks are moved towards one another, leaving a safety distance, thereby creating a virtually full-surface conveyor plane for a freight unit. However, the distance may just as easily be adjusted taking account of other criteria, in particular a conveying property of the freight unit. In other words, the distance adjustment may also be set depending on the dimensional stability (flexible or dimensionally stable freight units) or surface properties of the freight units. Moreover, the positioning conveyor unit is also able to service stack gaps between freight units or between a freight unit and a wall part of the loading aid and fill it with a suitable freight unit. This enables an even higher loading density to be obtained in the freight stack than is the case with the loading principles known from the prior art.

However, the objective is also achieved by the characteristics and features according to another aspect of the invention. Not only is the consignment system proposed by the invention suitable for automated loading of freight units onto a freight carrier, in particular an order pallet, the freight units may also be individually placed on the positioning conveyor unit, the advantage of which is that the distance between the conveyor tracks can be adjusted so that the freight units are reliably conveyed to the consignment area on the one hand and the consignment staff can easily remove the freight unit from the positioning conveyor unit on the other hand. Removal by commissioning staff can be made easier in particular if the freight unit protrudes out from the side of the conveyor tracks to a sufficient degree and can be taken hold of by the hands from underneath. The operator is therefore able to work in ergonomically favorable conditions.

Also of advantage is an embodiment where because the movements of the positioning conveyor unit and the feeding conveyor system can be effected separately from one another and, whilst the positioning conveyor unit is still moving a freight unit towards the loading position, the next freight unit can be simultaneously moved in the x direction towards the x position in the freight stack pre-specified for it.

As defined in a further embodiment, the conveyor tracks can be moved out synchronously in the depth direction of the freight carrier in order to transport a freight unit to the z position specified for it.

Also of advantage are further embodiments, as a result of which the freight units can be oriented if necessary and deposited at the positioning conveyor unit in an exact position.

The lateral guides may be adjusted either to exactly the width of the freight unit to be stacked or substantially to the width of the freight unit to be stacked. If the lateral guides are adjusted to exactly the width of the freight unit, any deformations caused by manipulating it can be eliminated or reduced, in particular sagging of the side walls facing the lateral guides on the transport route along the feeding conveyor system. If lateral guides are provided in the form of conveyor devices and if they are adjusted to the width of the freight unit, the freight unit can be conveyed by means of the conveyor devices on the basis of friction. As a result of this feature, the frictional force acting on the freight unit is increased, thereby ensuring that it is reliably conveyed along the feeding conveyor system, and a freight unit which might have turned can be oriented exactly parallel with a loading and conveyor unit. By contrast, if handling flexible freight units, the lateral guides can be set at a distance essentially corresponding to the width less the degree of flexing.

Based on a further embodiment, a freight unit can be moved by the feeding conveyor system towards the positioning conveyor unit extending towards it in the z direction without additional mechanisms.

In an advantageous embodiment of the invention, the conveyor planes of the feeding conveyor system and the positioning conveyor unit preferably intersect and subtend an angle of less then 180°, and an angle between a horizontal and the conveyor plane of the positioning conveyor unit is smaller than an angle between a horizontal and the conveyor plane of the feeding conveyor system. As a result, a freight unit can be transferred from the feeding conveyor system to the positioning conveyor unit essentially without jolting, irrespective of the position of its center of gravity. Due to the inclined conveyor plane along a longitudinal portion of the positioning conveyor unit, a freight unit can be deposited on the freight carrier or in an already existing stack position in a controlled manner.

The lightly descending conveyor plane according to another embodiment enables the center of gravity of freight units to be shifted in a controlled manner in situations where they contain an article which has a centre of gravity that is not stable, such as a liquid, powder and such like, thus ensuring that freight units can be transferred from the feeding conveyor system to the positioning conveyor unit essentially without shifting induced by inertia, even at high transfer speeds.

As a result of another embodiment, a difference in height between the end of the feeding conveyor system disposed downstream and the conveyor tracks disposed underneath it can be bridged, which means that even particularly sensitive freight units with a geometry that is not particularly conducive can be transferred from the feeding conveyor system to the conveyor tracks.

Another embodiment enables freight units to be fed continuously.

In an advantageous embodiment of the invention, the distributor conveyor system links the stationary feeding system to the feeding conveyor system, which can be moved in the x direction, thereby enabling several loading cycles to be run simultaneously. For example, a first freight unit can be conveyed from the feeding conveyor system to the positioning conveyor unit and transferred from the latter to the freight carrier, during which time a second freight unit is already being moved to a transfer position by the distributor conveyor system. The distributor conveyor system is able to move relative to the feeding and positioning conveyor units in the x direction at high speed. If there is any slight relative shifting of the freight unit on the distributor conveyor system, the freight unit can be re-oriented/re-positioned by means of the subsequent re-orienting operation and transferred from the feeding conveyor system to the positioning conveyor unit with a high degree of positioning accuracy. This improves the efficiency of the device.

Another embodiment is also of advantage because the feeding conveyor system and positioning conveyor unit have to be moved in horizontal planes only and the y position of a freight unit in the freight stack is obtained by lifting or lowering.

As a result of an embodiment, a freight carrier can also be loaded manually by consignment personnel.

As defined in another embodiment, a conveying property of the freight units is detected by an electronic detection system, for example on a warehouse management computer, by entering consignment orders or by means of an appropriate sensor system disposed in the region of the feeding system for example, and the dimension, geometry, dimensional stability, surface properties and/or a length/width/height ratio are detected, preferably without contact, by means of an opto-electronically or acoustically operated sensor system, such as laser, infrared or ultra-sound sensors.

As defined in another embodiment, the positioning conveyor unit is moved to the side into a standby position next to the freight carrier so that a consignment handler can move in front of the freight carrier unobstructed and has free access to the freight carrier.

In another embodiment, a freight unit can be transferred to a loading plane of the freight carrier or a stack position particularly gently and the positioning conveyor unit can also be operated gently.

The features defined in further embodiments are also of advantage because, unlike the system used to load freight carriers known from the prior art, gaps between freight units already on the freight carrier or between a freight unit and a wall part of a loading aid within a stack position can also be filled with one or more freight units, thereby ensuring optimum capacity usage and stability in the freight stack. Since the lateral pressing force of the conveyor track on the side wall of the freight units already on the freight carrier is low, the freight unit to be stacked, which is already positioned in the gap in the z position, is able to slide downwards solely by force of gravity between the side walls of the freight units or the side wall of a freight unit and a wall part as the conveyor tracks are being moved back in the z direction. The conveyor track is placed on the bottom half of the freight unit against the side wall so that the side wall of the freight unit still to be stacked and the side wall of the freight unit already on the freight carrier overlap to a sufficient degree and as the freight unit slides down, the side walls do not move out of line. Furthermore, due to the frictional contact between the side walls of the freight unit to be deposited and the already positioned freight unit, the latter is retained and the freight stack stabilised as the conveyor tracks are being moved back in the z direction. As defined in one embodiment, a "downward sliding" of the freight unit still to be stacked is made easier because the side walls of the freight unit to be deposited and the freight unit already positioned either do not come into contact at all or there is only a negligible frictional force between them.

As defined in another embodiment, the freight unit is placed by the distributor conveyor system in a position which already corresponds to the loading position of the "current" freight unit in the freight stack in the x direction set by the computer system.

The feature defined in another embodiment is of advantage because already during the preceding loading cycle of a freight unit, in particular whilst the positioning conveyor unit is being moved in and out in the z direction, a freight unit of the next loading cycle can be accommodated on the feeding conveyor system.

Finally, the feature defined in another embodiment is of advantage because a freight unit can be transferred between the distributor conveyor system (slave) and feeding conveyor system (master) to any x position whilst it is being moved in the x direction.

To provide a clearer understanding, the invention will be described in more detail below with reference to the appended drawings.

Of these:

Figure 1:
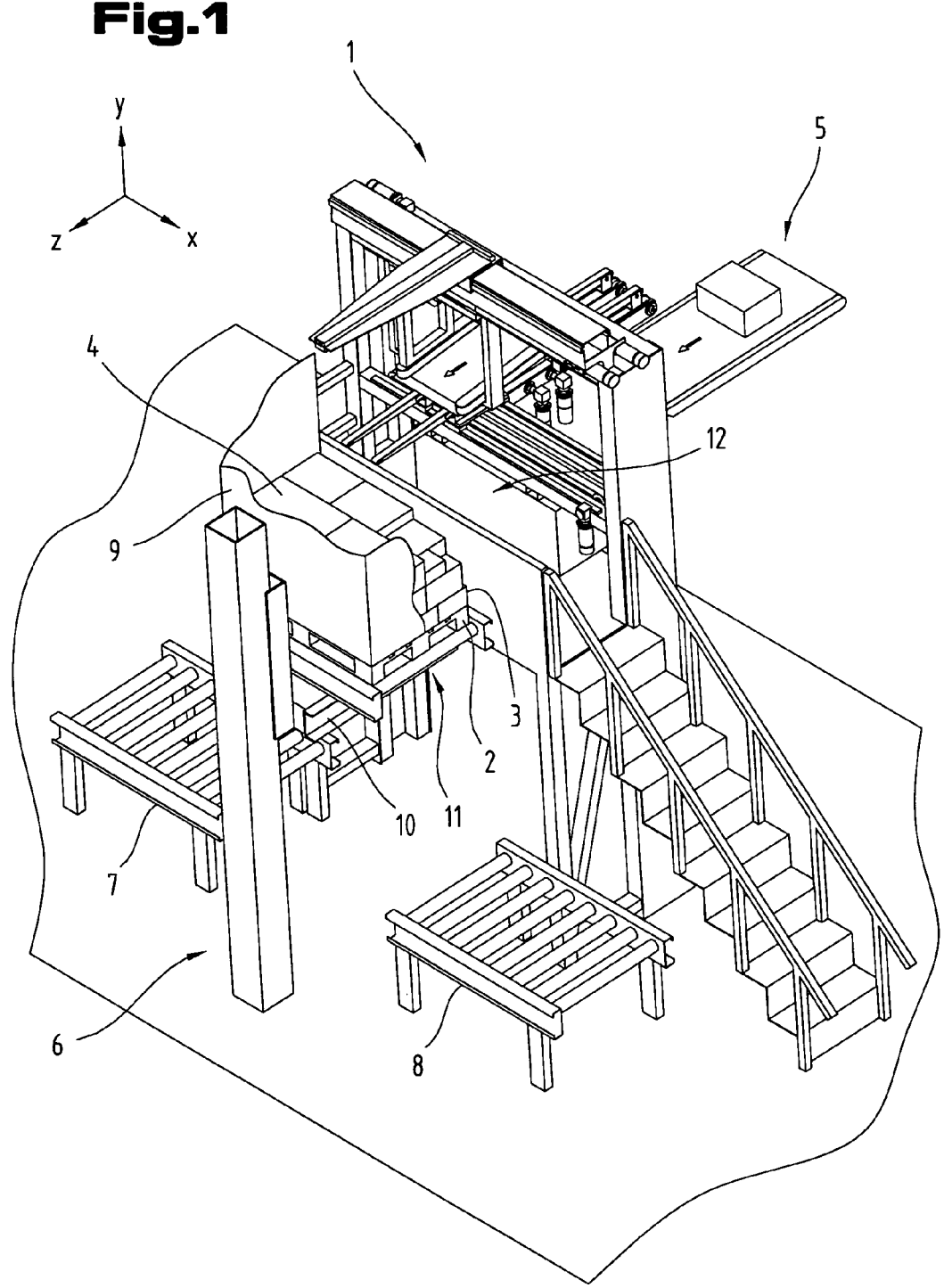
FIG. 1 is a simplifies, perspective diagram showing a section of a consignment system with a device for automatically loading a freight carrier.
Figure 2:
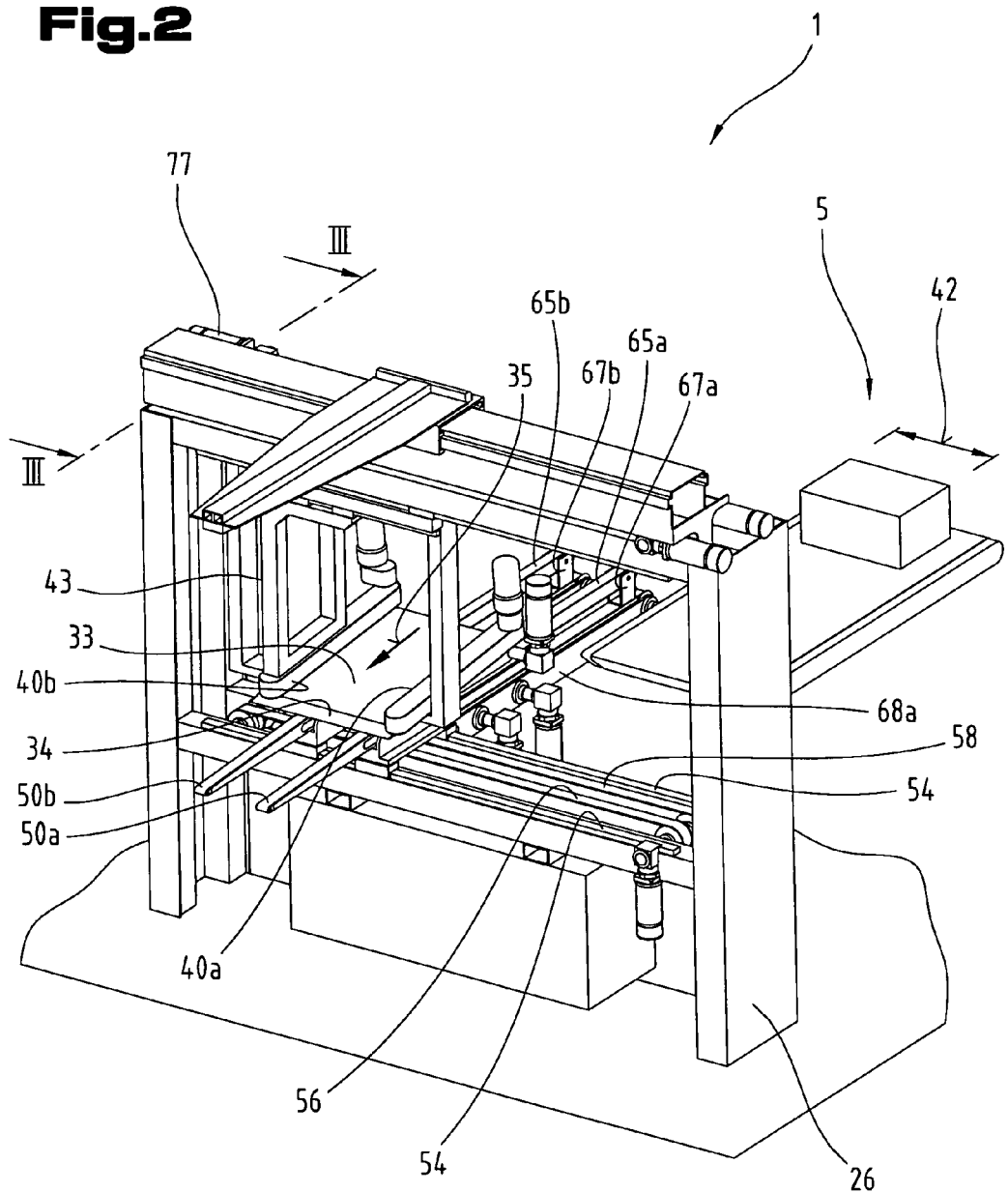
FIG. 2 is a perspective view of the device for automatically loading the freight carrier illustrated in FIG. 1.

FIG. 14a-j are simplified diagrams illustrating a plan view of a consignment system with a different embodiment of the device and a diagram illustrating the sequence of the loading cycles.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 is a perspective view illustrating a consignment system proposed by the invention, comprising a device 1 for loading a freight carrier 2 with freight units 3 forming a freight stack 3, a feeding system 5, a lifting station 6 for raising and lowering a freight carrier 2 and a conveyor system 7, 8 for bringing in empty freight carriers 2 and taking away loaded freight carriers 2 as well as a loading aid 9. The conveyor system 7, 8 is provided in the form of a roller conveyor, belt conveyor and such like. The lifting station 6 is provided with a freight carrier-switching unit 11 disposed on a lifting table 10 which can be raised and lowered, provided in the form of a drivable roller conveyor in this example of an embodiment. When the freight carrier-switching unit 11 is in the lowered switch position, a loaded freight carrier 2 can be transferred to the conveyor system 7 or an empty freight carrier 2 can be received by the conveyor system 8.

Figure 13:
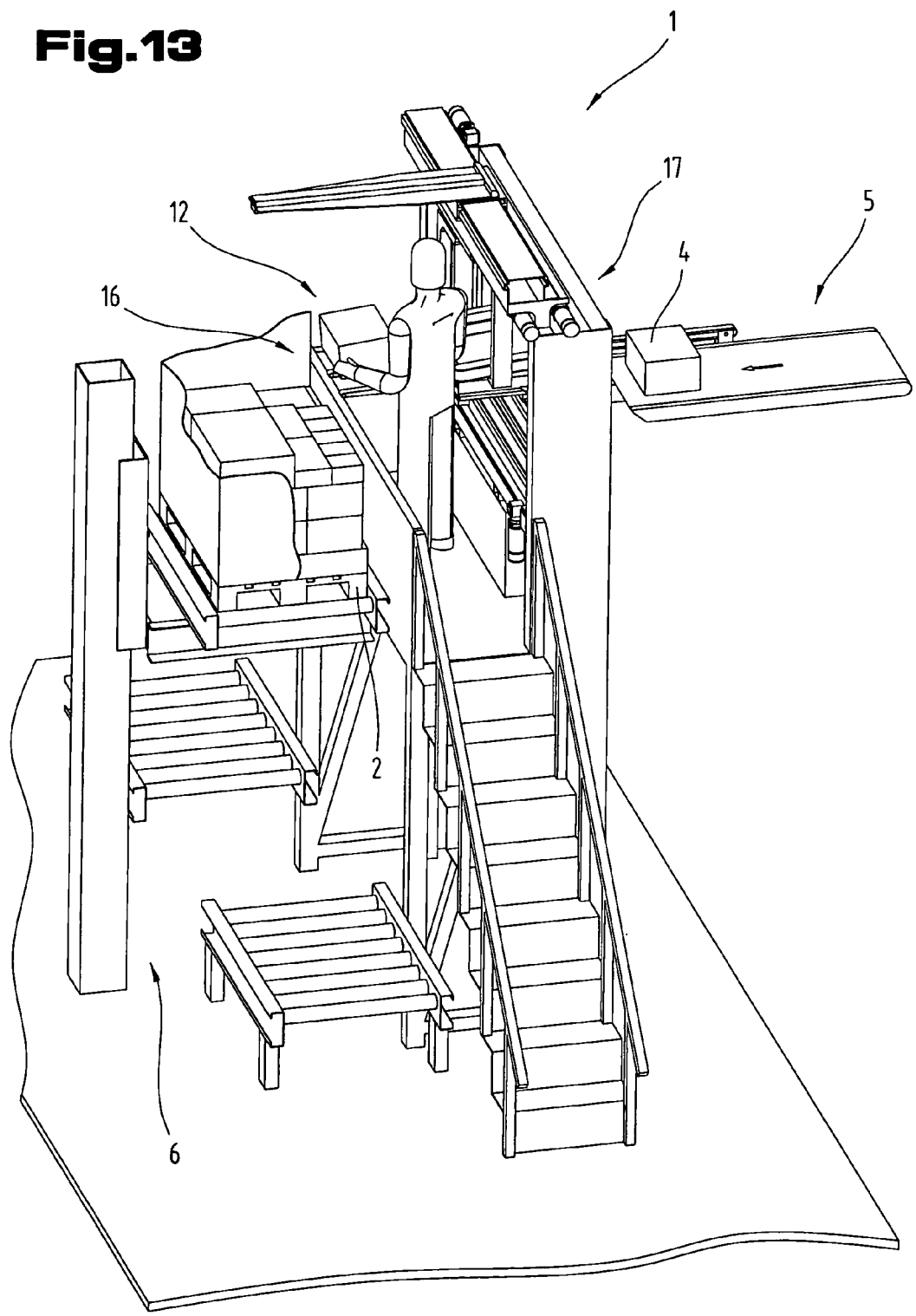
FIG. 13 is a simplified diagram showing a perspective view of a consignment system proposed by the invention with the device illustrated in FIG. 1 for a manual loading operation of the freight carrier by consignment personnel.

In this embodiment, the consignment system also has a consignment area 12, which is illustrated in more detail in FIG. 13.

FIGS. 2 to 8 illustrate different views of the device 1 for automatically loading the freight carrier 2 (FIG. 1), in particular an order pallet, with the freight units 4 needed to make up a consignment order. The device 1 has a positioning conveyor unit 16, a feeding conveyor system 17, an orienting device 18 and a load monitoring system 19.

The feeding conveyor system 17 is mounted on a positioning carriage 20 which has a support frame. The support frame comprises a top support 21 and bottom support 22 as well as support arms 23 extending parallel at a distance apart between them. The positioning carriage 20 is mounted on a base frame 26 of the device 1 so that it can be moved by means of a displacement device 24 horizontally along a guide arrangement in the x direction 25 alongside the freight carrier 2 (FIG. 1). The base frame 26 has uprights 27 and cross-members 28 connecting them. The guide arrangement is disposed between the cross-members 28 and top support 21 of the positioning carriage 20 and is provided in the form of linear guides 29.

Figure 3:
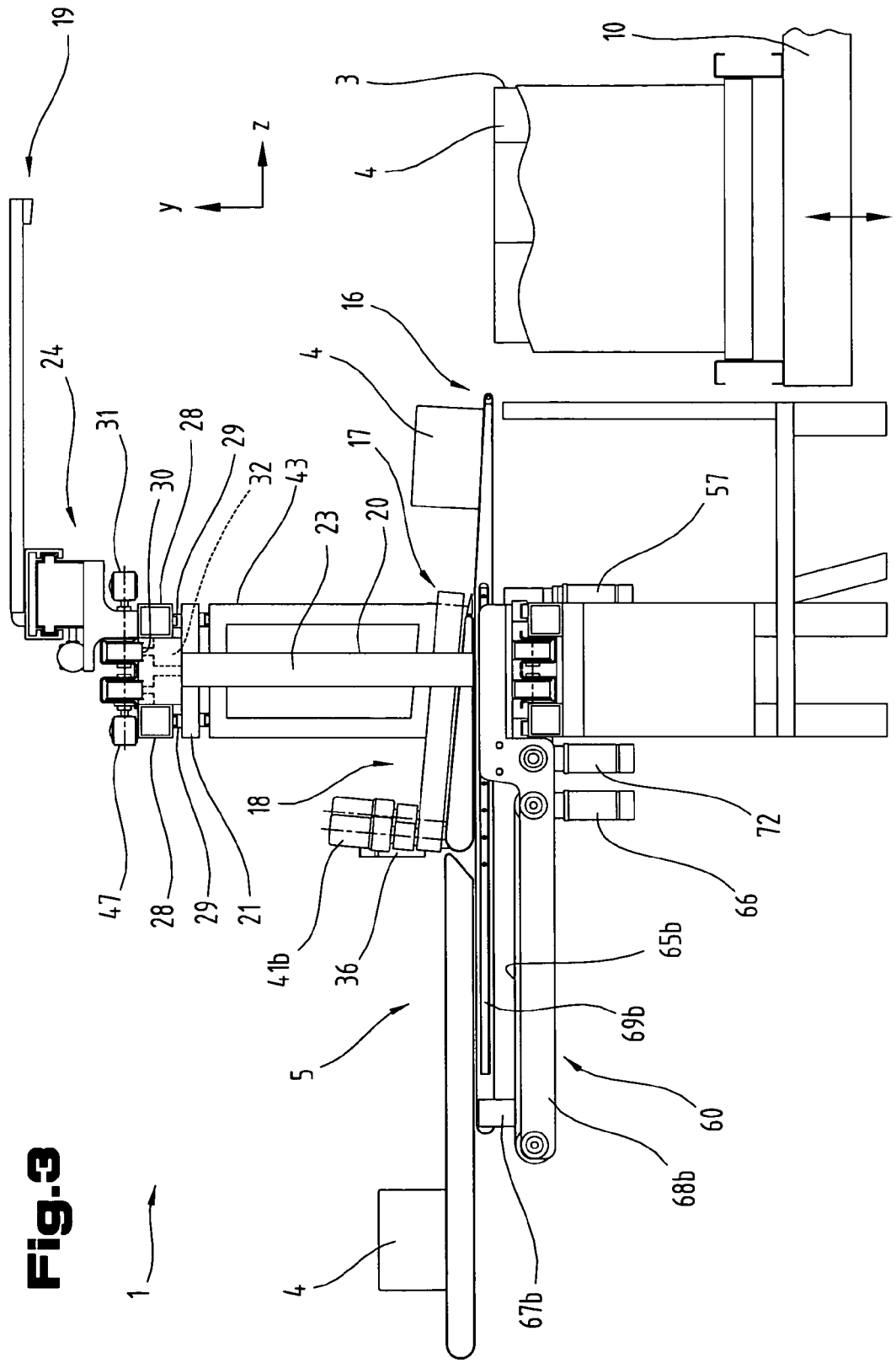
FIG. 3 is a side view of the device for loading a freight carrier in section along line III-III indicated in FIG. 2, with a feeding system, feeding conveyor system, orienting device and positioning conveyor unit in its transfer position.

The displacement device 24 schematically illustrated in FIG. 3 is provided in the form of a linear drive and in the embodiment illustrated as an example has a traction drive. The traction drive comprises an endlessly circulating traction means 30, which is guided round a pulley wheel and a driving wheel coupled with an actuator motor 31. The traction means 30 is provided in the form of a toothed belt, a chain or such like, for example. Secured to the traction means 30 is a driving carriage 32 which is coupled with the support frame of the positioning carriage 20. A rotating movement of the driving wheel in the clockwise direction or anti-clockwise direction causes the positioning carriage 20 and the feeding conveyor system 17 mounted on it to be moved horizontally alongside and relative to the freight carrier 2 in the x direction to an x position in the freight stack 3 fixed by a computer system (warehouse management computer).

The feeding conveyor system 17 comprises a linear conveyor system, in particular a belt conveyor 33, band conveyor and such like, driven by a conveyor motor 36 and a slide ledge 34 disposed at the front end parallel with its front edge and at a slight distance from it. The belt conveyor 33 constitutes a conveyor plane extending in the conveying direction 35 of the freight units 4 and inclined downwards towards its front end. The slide ledge 34 has a transfer plane in the conveying direction 35 of the freight units 4 which extends in a downward incline towards its front end, and the conveyor plane of the belt conveyor 33 and the transfer plane of the slide ledge 35 subtend an angle of more than 180°.

The orienting device 18 has lateral guides which can be moved relative to one another and which are provided in the form of conveyor systems 40a, 40b, in particular belt conveyors, band conveyors and such like, disposed parallel with one another in the conveying direction 35 of the freight units 4 at a distance apart from one another in the embodiment illustrated as an example here. Each conveyor system 40a, 40b is coupled with a driving motor 41a, 41b. The circulation speed of the conveyor systems 40a, 40b more or less corresponds to the circulation speed of the belt conveyor 33.

As will be described in more detail below, a whole range of different freight units 4 of different dimensions, geometries, dimensional stability, surface properties and/or length/width/height ratios usually have to be positioned within the consignment system. In situations where a consignment order is made up of freight units 4 of differing widths 42 (dimensions), the conveyor systems 40a, 40b are adjusted accordingly.

At this stage, it should be pointed out that in the case of flexible freight units 4, the width is regarded as the width 42 less the amount of flexing which occurs.

In the embodiment illustrated as an example, the right-hand conveyor system 40a is disposed stationary on the support frame of the positioning carriage 20, whereas the left-hand conveyor system 40b is able to move in the x direction relative to the positioning conveyor unit 17. The left-hand conveyor system 40b is disposed on a positioning carriage 43 which has a support frame. The support frame comprises a frame 37 and cantilevers 38. The positioning carriage 43 is mounted on the positioning carriage 20 of the positioning conveyor unit 17 so that it can be moved in the x direction 25 along a guide arrangement by means of a displacement device 44. The guide arrangement is provided in the form of linear guides 45 disposed between the top support 21 of the positioning carriage 20 and the cantilevers 38 of the positioning carriage 43.

The displacement device 44 is provided in the form of a linear drive and, in the embodiment illustrated as an example, has a traction drive. The traction drive comprises an endlessly circulating traction means 46 guided around a pulley wheel and a driving wheel coupled with an actuator motor 47. The traction means 46 is provided in the form of a toothed belt, a chain or such like, for example. Secured on the traction means 46 is a driving carriage 48, which is coupled with the support frame of the positioning carriage 43. The direction of rotation of the actuator motor 47 is reversible so that the positioning carriage 43 and hence the conveyor system 40b is moved in the x direction either towards the oppositely lying conveyor system 40a or away from it. The distance between the conveyor systems 40a, 40b can be adjusted to different widths 42 of the loading aid 4. The fact that preferably only one of the conveyor systems 40a, 40b is moved makes it easier to set up the displacement device 44, and freight units 4 of differing widths are always positioned relative to one and the same reference line on the stationary conveyor system 40a.

Alternatively, however, it would also be possible for the right-hand conveyor system 40a to be moved by the displacement device relative to the positioning conveyor unit 17 in the x direction as well, in which case the two conveyor systems 40a, 40b can be moved synchronously towards one another or apart from one another. The advantage of this is that freight units 4 of differing widths can be positioned centrally on the feeding conveyor system 17.

The positioning conveyor unit 16 has parallel conveyor tracks 50a, 50b, each of which is disposed on a guide carriage 51a, 51b and mounted on the base frame 26 of the device 1 so that it can be moved by means of a first displacement device 52 in the x direction along a guide arrangement into a transfer position. In the transfer position, the conveyor tracks 50a, 50b are set to a distance 53 determined by the computer system on the basis of the conveying property of the freight unit 4 to be stacked and are positioned underneath the feeding conveyor system 17 so that a freight unit 4 lying on the feeding conveyor system 17 can be transferred centrally relative to the conveyor tracks 50a, 50b.

As described above, the positioning points for the freight unit 4 can be optimally adjusted due to the variable distance 53 between the conveyor tracks 50a, 50b. Particularly in the case of flexible freight units 4, it has been found to be of advantage if the freight units 4 lie so that they protrude laterally out from the conveyor tracks 50a, 50b by a distance of approximately 15% to 25% of the width 42 respectively, so that the freight units 4 will flex more or less uniformly in the portion of the freight unit 4 between the conveyor tracks 50a, 50b and at the protruding portions of the freight unit 4.

The guide arrangement comprises linear guides 54 disposed between the guide carriages 51a, 51b and cross-members 55 of the base frame 26.

The displacement device 52 is provided in the form of a linear drive and, in the embodiment illustrated as an example, has a first and a second traction drive. The first traction drive comprises an endlessly circulating traction means 56 which is guided around a pulley wheel and a driving wheel coupled with an actuator motor 57. The traction means 56 is provided in the form of a toothed belt, a chain or such like, for example, and is fixedly connected to the guide carriage 51a mounting the conveyor track 50a. The second traction drive comprises an endlessly circulating traction means 58 guided around a pulley wheel and a driving wheel coupled with an actuator motor 59. The traction means 58 is provided in the form of a toothed belt, a chain or such like, for example, and is fixedly connected to the guide carriage 51b mounting the conveyor track 50b. Rotating the driving wheels in the clockwise direction or in the anti-clockwise direction moves the conveyor tracks 50a, 50b in the x direction to their transfer position.

Figure 4:
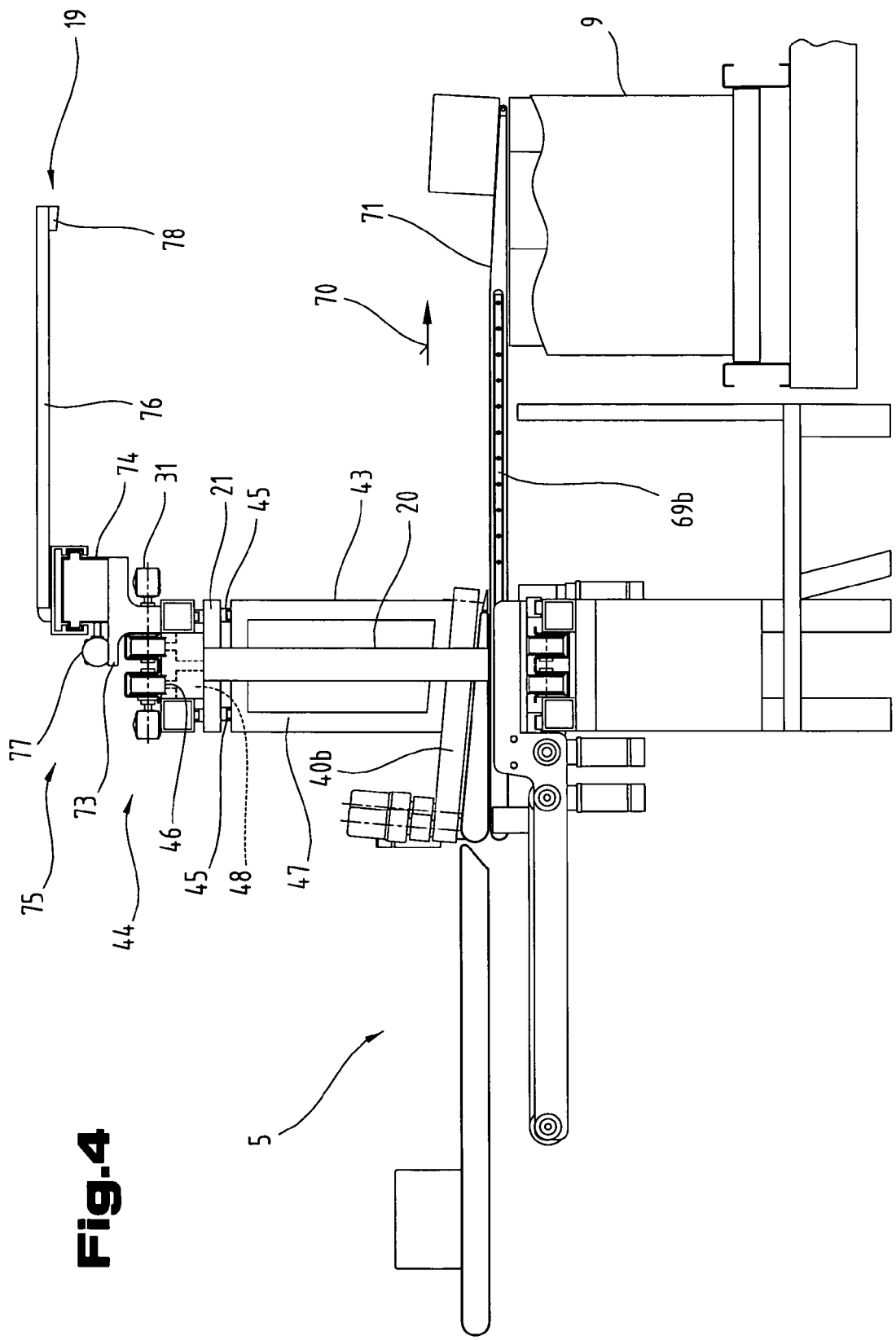
FIG. 4 is a side view of the device illustrated in FIG. 3 with the positioning conveyor unit in its loading position.

The conveyor tracks 50a, 50b can be moved in the z direction as well (depth direction of the freight carrier 2), more or less synchronously, by means of a second displacement device 60 between a retracted transfer position illustrated in FIG. 3 and an extracted loading position illustrated in FIG. 4. In their transfer position, the conveyor tracks 50a, 50b extend in the z direction at the front end of the feeding conveyor system 17. In the loading position, the conveyor tracks 50a, 50b are positioned so that a freight unit 4 is moved alongside an x and z position in the freight stack 3 specified for it by the computer system.

The extraction movement of the conveyor tracks 50a, 50b is made possible by the displacement device 60, which is provided in the form of a linear drive and, in the embodiment illustrated as an example, has a first and a second traction drive. The traction drives each comprise an endlessly circulating traction means 65a, 65b guided around a pulley wheel and a driving wheel. The driving wheels are coupled via a drive shaft, although this is not illustrated, with a common displacement motor 66. However, each driving wheel could be just as easily be coupled with a displacement motor. The traction means 65a, 65b are provided in the form of a toothed belt, a chain or such like, for example, to which a coupling carriage 67a, 67b is secured. The traction drives are each mounted on a framework 68a, 68b, and the right-hand framework 68a is fixedly connected to the guide carriage 51a mounting the conveyor track 50a whilst the left-hand framework 68b is fixedly connected to the guide carriage 51b mounting the conveyor track 50b. The displacement motor 66 is secured to the framework 68a.

The conveyor tracks 50a, 50b are each mounted by means of a guide arrangement, in particular a linear guide 69a, 69b on the guide carriage 51a, 51b illustrated in the drawings and, in what is their rear end in the extraction direction 70, are connected to the coupling carriage 67a, 67b. The direction of rotation of the displacement motor 66 is reversible so that, depending on the direction of rotation, the conveyor tracks 50a, 50b with a freight unit 4 supported on them can be moved out to the allocated z position in the freight stack 3 (FIG. 4) and then moved back into the transfer position to pick up another freight unit 4 (FIG. 3).

As illustrated in the drawings, the conveyor tracks 50a, 50b each have a linear conveyor system with a conveyor means 71, in particular a conveyor band, conveyor belt and such like, which are coupled with a common conveyor motor 72. The conveyor motor 72 is secured to the framework 68a. However, each conveyor means 71 could just as easily be driven by a separate conveyor motor.

In another embodiment, although this is not illustrated, the right-hand conveyor track 50a is secured to the positioning carriage 20 of the feeding conveyor system 17 and only the left-hand conveyor track 50b can be moved in the x direction. In this embodiment, the displacement device 52 has only the second traction drive. The first traction drive can be dispensed with, which thus simplifies assembly of the displacement device 52 as a whole.

As also indicated in the drawings, a supporting section 73 is attached to the cross-member 28 of the base frame 26. A guiding section 74 lies on the supporting section 73, on which a retaining arm 76 is mounted so that it can be moved in the x direction by a displacement device 75. The displacement device 75 has an actuator motor 77 and a traction drive, not illustrated, the traction means of which is connected to the retaining arm 76. Disposed at the front end of the retaining arm 76 is the load monitoring system 19 provided in the form of an opto-electronic or acoustic scanning device 78, in particular a scanner, which detects the loading status, such as the current height of the freight stack 3 and/or a loading pattern in a stack position.

A description will now be given below of the method proposed by the invention for loading the freight carrier 2 with the device 1 described above on an automated basis.

As soon as the detection system, not illustrated, for example a warehouse management computer, detects one or more consignment orders, which are orders for assembling and loading to set up a freight delivery to a retail outlet for example, the freight units 4 needed to make up a consignment order are picked up by an automated conveyor system, not illustrated, for example by a rack-serving vehicle, from a warehouse and delivered to the device 1 in the dispatch zone. In the dispatch zone, the freight units 4 are loaded by the device 1 onto the freight carrier 2, in particular order pallets, the finished freight stack 3 is wrapped at a film wrapping machine (not illustrated) to stabilise it with securing means such as a film, strapping or similar, after which it is loaded onto a lorry.

Even before the freight units 4 are delivered to the device 1, an identification code of the freight units 4 is detected and used by the warehouse management computer to determine the conveying property stored for each freight unit 4. The conveying properties are defined on the basis of the dimension, geometry, dimensional stability, surface properties and/or a length/width/height ratio and such like of the freight unit 4. From this data, in addition to the distance adjustment of the conveyor systems 40a, 40b and conveyor tracks 50a, 50b described above, the warehouse management computer determines the loading positions for the freight units 4 in the freight stack 3 and thus specifies an x position, y position and z position in the freight stack 3 for every freight unit 4. The loading positions are set by the warehouse management computer making allowance for a range of different aspects. For example, the finished freight stack 3 should be as stable as possible and easy to transport, which means that heavy freight units 4 are positioned at the bottom of the freight stack 3 and lighter freight units 4 at the top of the freight stack 3. Similarly, sensitive freight units 4 are positioned at the top of the freight stack 3. The freight stack 3 should also be packed as densely as possible and should be as high as possible. Once the optimum loading positions for the freight units 4 have been computed on the basis of stability and/or capacity usage of the freight stack 3, the warehouse management computer determines a loading sequence. The freight units 4 are conveyed separately one after the other on the basis of this sequence by the feeding system 5 to the feeding conveyor system 17.

In the case of another embodiment, the loading positions (x, y and z positions) for the freight units 4 in the freight stack 3 are determined on the basis of the load status detected by the load monitoring system 19 and depending on this, the freight units 4 are delivered separately in the appropriate sequence by the feeding conveyor system 17.

Then, the freight unit to be stacked 4, if necessary even before it is transferred to the conveyor tracks 50a, 50b projecting in the z direction at the front end of the feeding conveyor system 17 and moved into the transfer position between the relatively displaceable conveyor systems 40a, 40b, is oriented in the direction parallel with the conveying direction 35 of the freight units 4. To this end in the embodiment illustrated as an example, the conveyor system 40b is moved towards the oppositely lying conveyor system 40a so that the distance between the conveyor systems 40a, 40b is slightly bigger than the width 42 of the freight unit 4 or corresponds exactly to the width 42 of the freight unit 4. In the case of flexible freight units 4, the conveyor systems 40a, 40b can also be set to a distance essentially corresponding to the width 42 less the amount of flexing which occurs.

Once an individual freight unit 4 has been picked up by the feeding conveyor system 17, the positioning carriage 20 is moved in the x direction until the freight unit 4 is disposed at the allocated x position in the freight stack 3.

Before the freight unit 4 is transferred by the feeding conveyor system 17 to the positioning conveyor unit 16, the conveyor tracks 50a, 50b are still being moved into the transfer position in which the distance was set on the basis of the conveying property of the freight unit 4 to be transferred and the freight unit 4 can be transferred centrally relative to the conveyor tracks 50a, 50b. The freight unit 4 is then conveyed by the feeding conveyor system 17 to the positioning conveyor unit 16.

Once the freight unit 4 has been taken over by the positioning conveyor unit 16, its conveyor tracks 50a, 50b are moved relative to the feeding conveyor system 17 out of their transfer position illustrated in FIG. 3 into the loading position illustrated in FIG. 4, in which the freight unit 4 lying on the conveyor means 71 is disposed above its pre-allocated x and z positions in the freight stack 3. During the outward movement of the conveyor tracks 50a, 50b, the conveyor means 71 can be driven so that the freight unit 4 is positioned at the positioning conveyor unit 16, in particular transported to its front end, which is preferable and practical especially in the case of freight units 4 of smaller dimensions.

Figure 5:
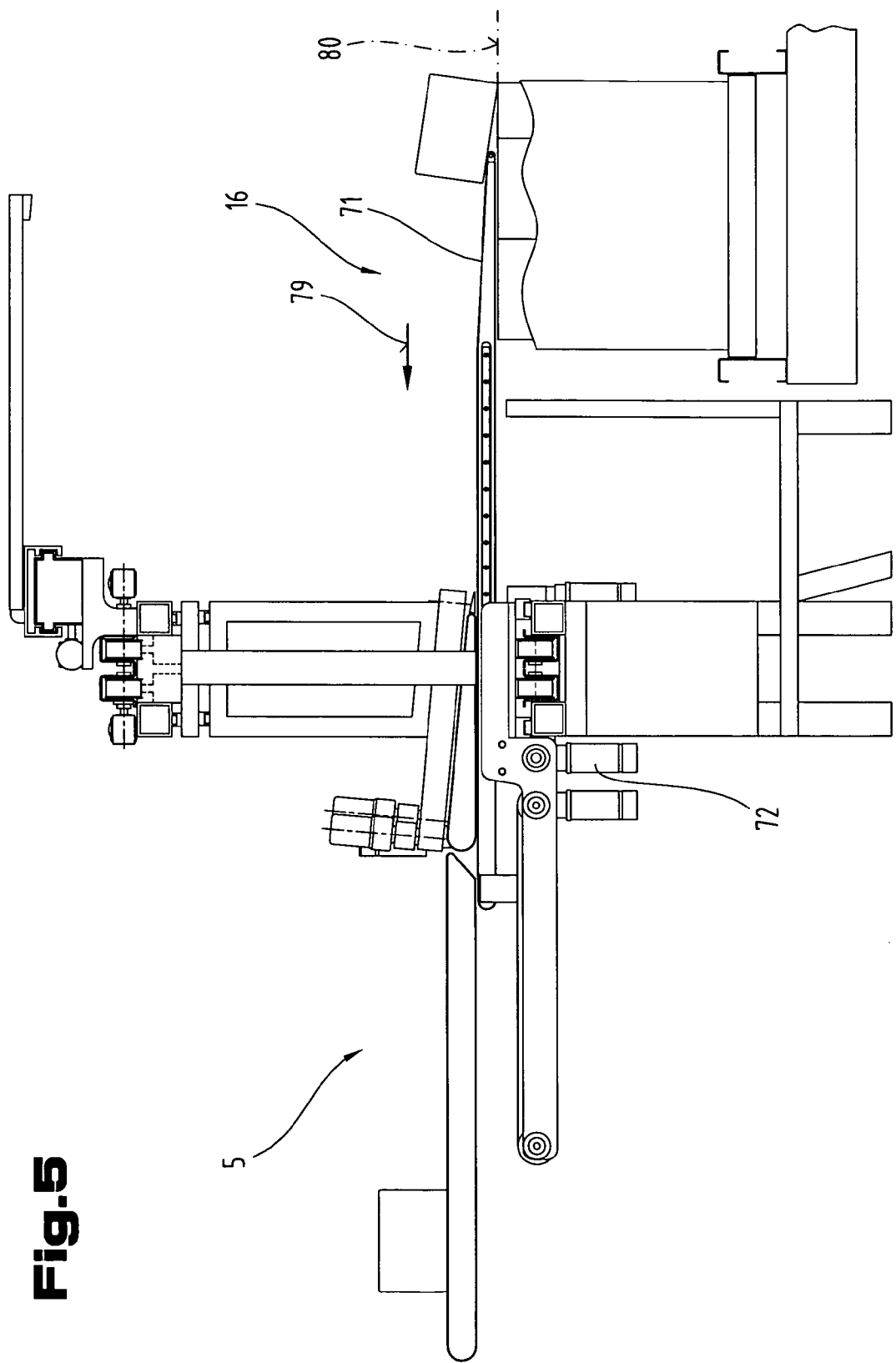
FIGS. 5 and 6 show a side view of the device illustrated in FIG. 3 in which the positioning conveyor unit is moving back out of its loading position into the transfer position.

The conveyor tracks 50a, 50b together with the conveyor means 71 are then moved back in the reverse direction 79, whilst the conveyor means 71 on the support side are driven by the conveyor motor 72 opposite the reverse direction 79 in the conveying direction 35 of the freight units 4. The conveying speed of the conveyor means 71 corresponds in terms of amount to the reversing speed of the conveyor tracks 50a, 50b so that the conveyor means 71, in particular the conveyor belts underneath on the bottom face of the freight unit 4, are moved without any relative shifting of the freight unit 4. The freight unit 4 is removed from its position supported on the conveyor means 71 so that it tilts by its rear end in the reverse direction 79 onto the loading plane 80 of the freight carrier 2 or a stack position disposed on a lower level, as illustrated in FIG. 5.

In the z direction, the freight unit to be stacked 4 should lie as closely as possible against a freight unit 4 already disposed in the stack position or a wall part of the loading aid 9. This can be achieved if the conveying speed of the conveyor means 71 is slightly higher than the reversing speed of the conveyor tracks 50a, 50b.

Figure 6:
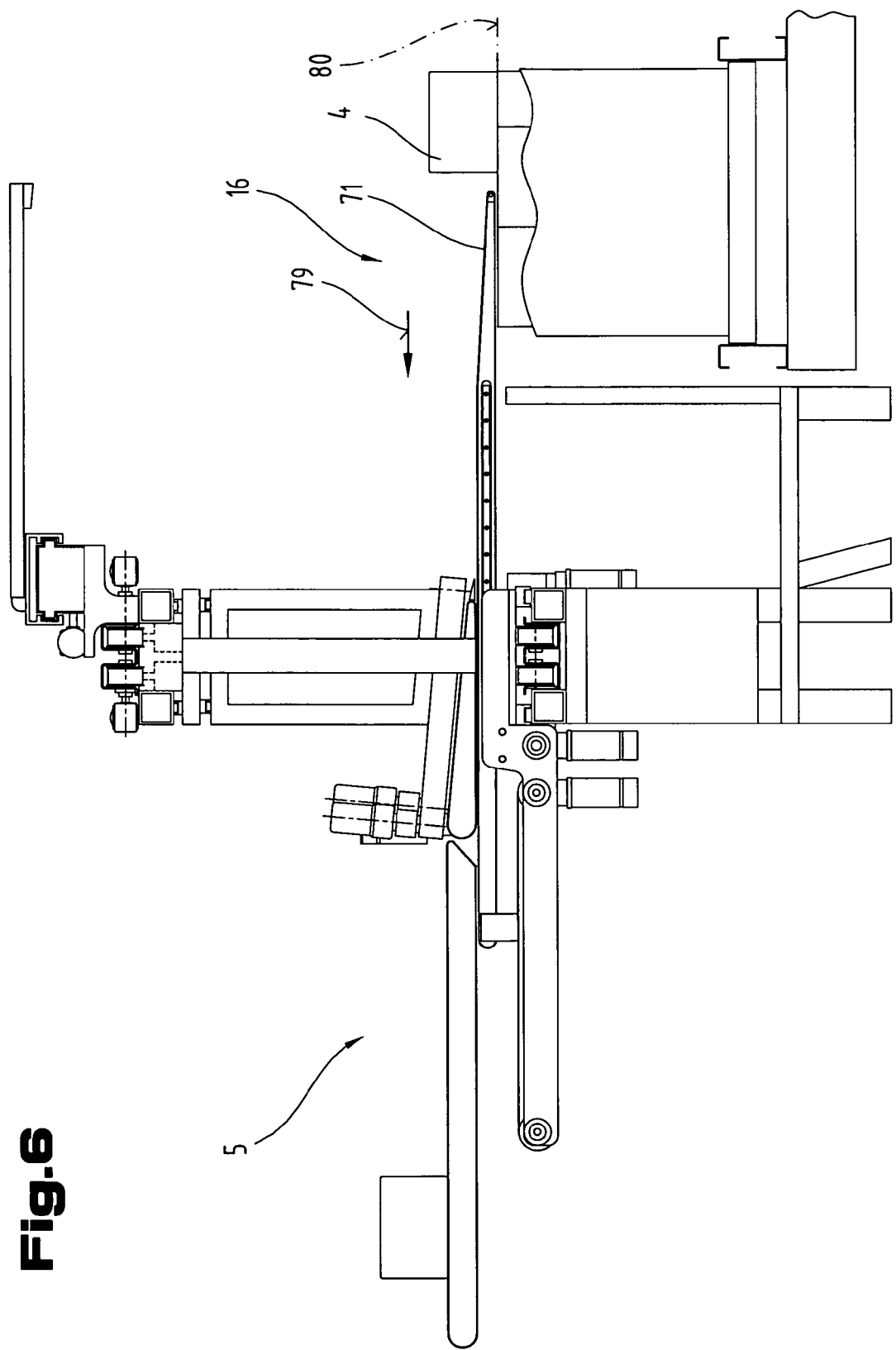
Figure 7:
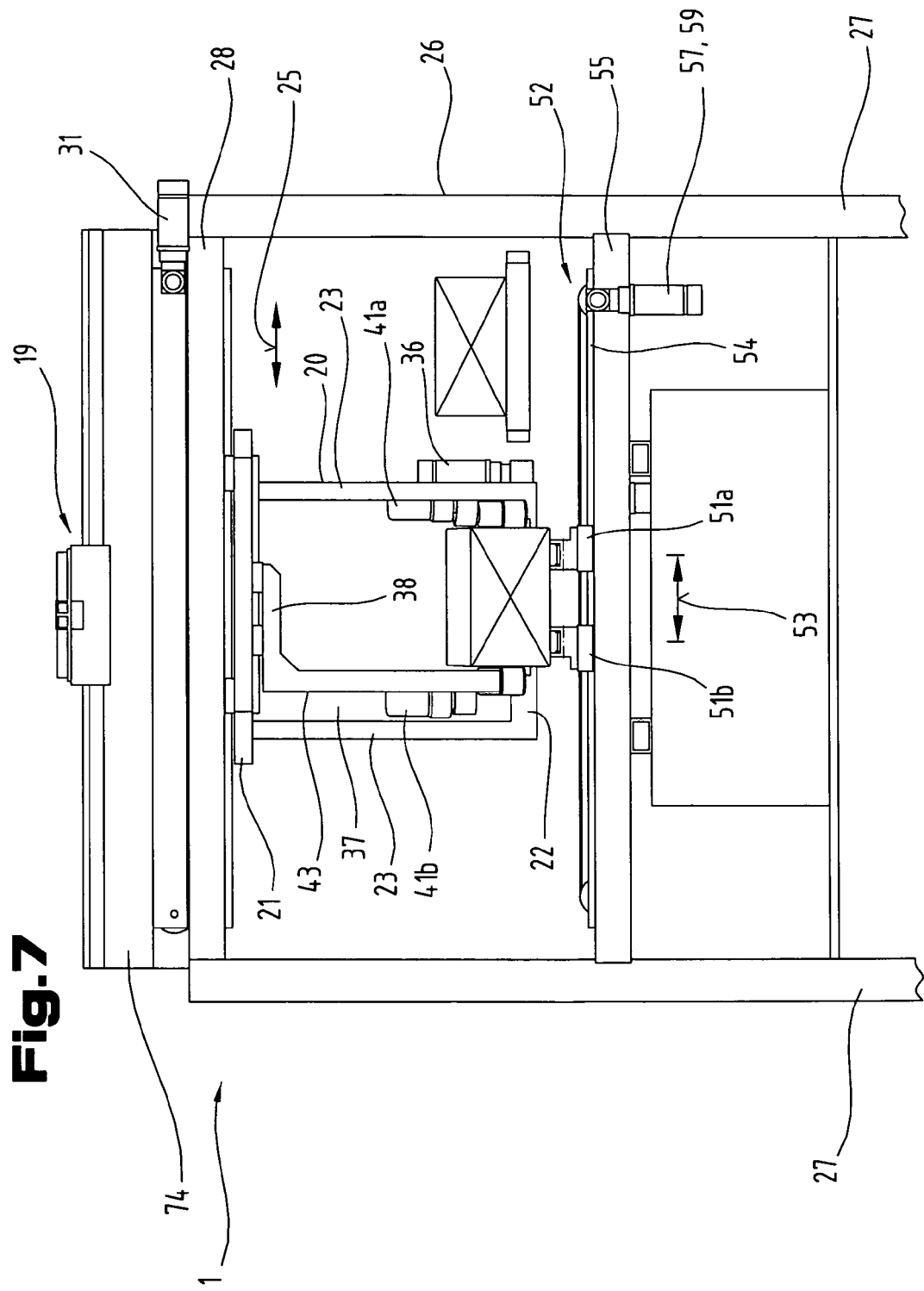
FIGS. 7 and 8 show a front view of the device illustrated in FIG. 2 with the conveyor tracks and lateral guides of an orienting device moved to accommodate different widths of freight units.
Figure 8:
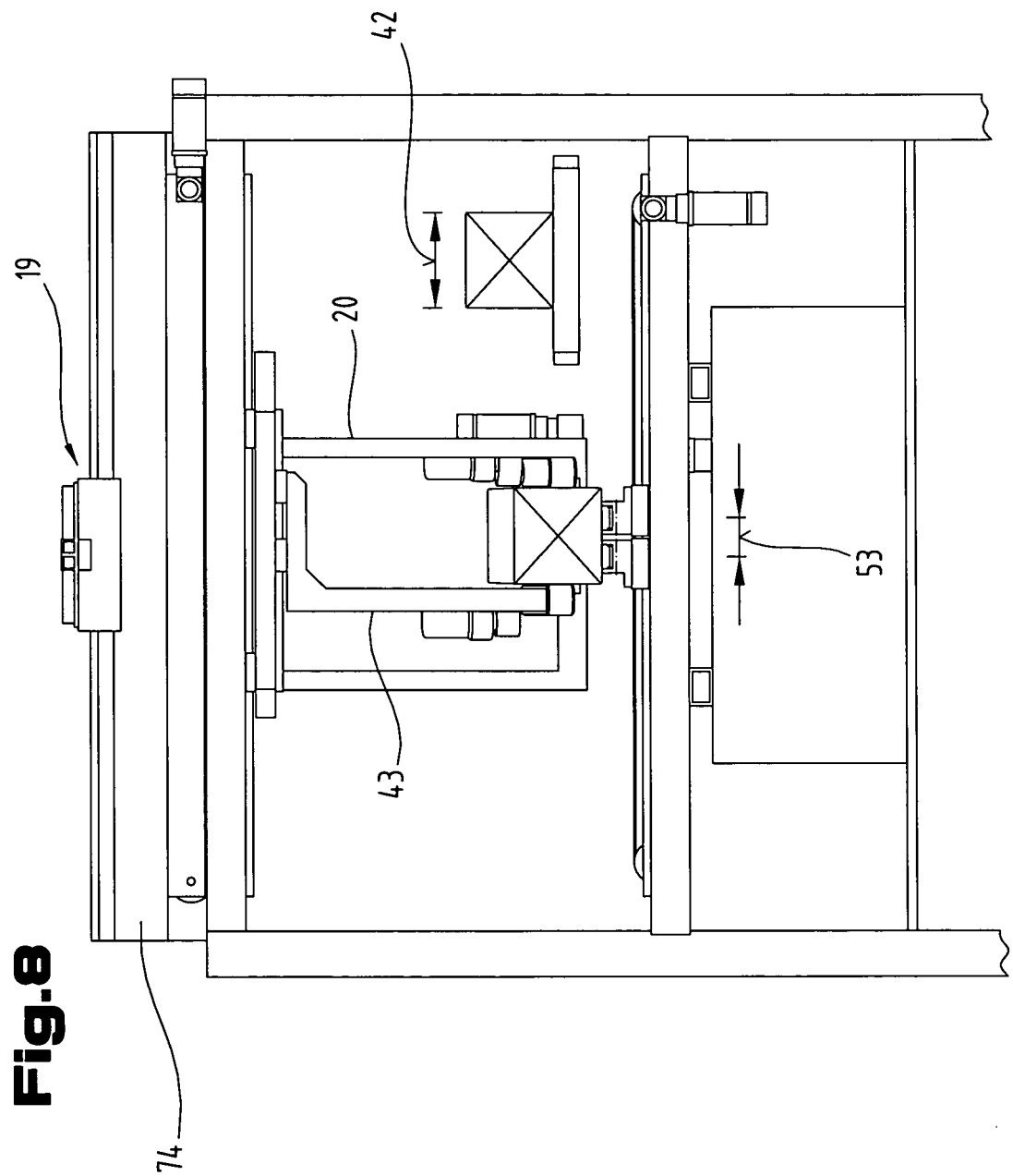

The loading operation is terminated when the freight unit 4 lies on the loading plane 80 and the conveyor means 71 has been moved completely away from underneath the freight unit 4, as illustrated in FIG. 6.

As soon as a position in the freight stack 3 has been filled, the lifting table 10 is moved downwards in the y direction, thus creating a new position in the freight stack 3.

As illustrated in FIGS. 3 to 6, a loading aid 9 is provided, which surrounds the freight stack 3 on three sides as it is created and thus serves as a support surface for a sliding movement of the freight unit 4 in the horizontal direction.

It is also of advantage if the movements of the freight units 4 on the feeding system 5, positioning conveyor unit 16 and feeding conveyor system 17 are uncoupled from one another. Accordingly, whilst the positioning conveyor unit 16 is still moving a freight unit 4 alongside the loading position, the next freight unit 4 is being moved by the feeding conveyor system 17 in the set x direction and/or whilst the feeding conveyor system 17 is moving a freight unit 4 in the set x direction, the next freight unit 4 is being moved alongside the front end of the feeding system 5. This enables the throughput efficiency of the device 1 to be increased.

Figure 9:
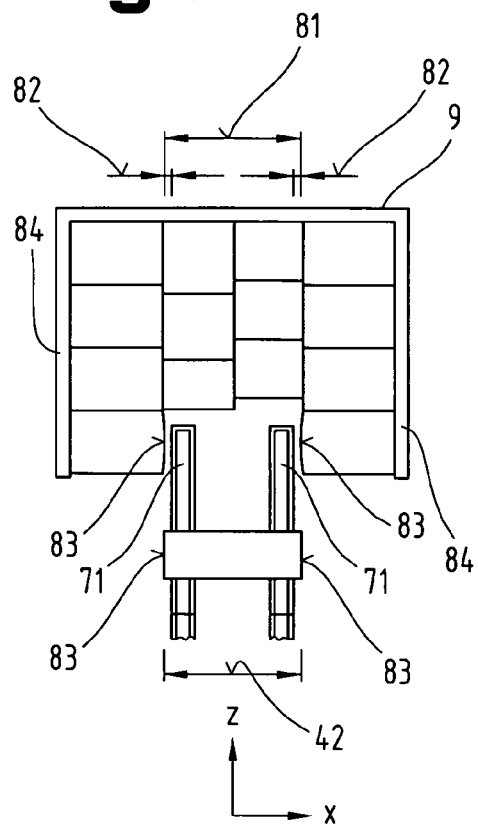
FIGS. 9 to 12 are simplified diagrams illustrating a plan view of a freight carrier with freight units stacked on it and a loading aid with different load patterns and conveyor tracks inserted in the gap between the freight units or a freight unit and a wall part of the loading aid.
Figure 10:
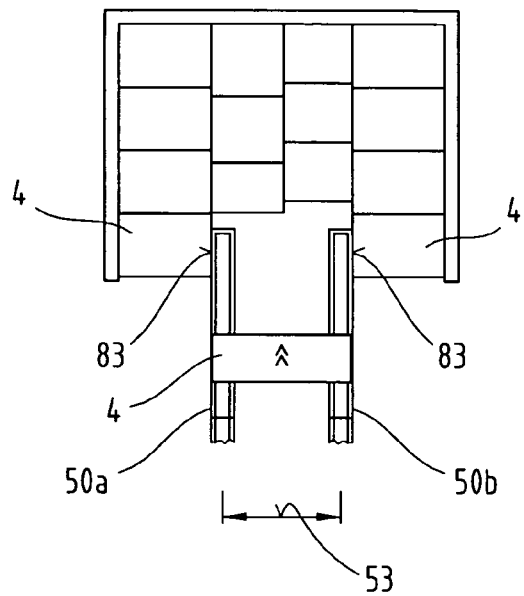

FIGS. 9 and 10 illustrate a loading pattern which can occur and a stack gap which can be created between freight units 4 within a stack position. A gap width 81 is computed by the computer system when the loading positions of the freight units 4 are being determined or is detected by the load monitoring device 19. The gap width 81 is preferably detected before a freight unit 4 is transferred to the freight stack 3, in particular based on the stack gap in a stack position, and the displacement device 52 is activated by the computer system so that the conveyor tracks 50a, 50b are moved relative to one another by the gap width 81 in the x direction and set to the distance 53 described below. Based on this embodiment, the conveyor tracks 50a, 50b are preferably moved synchronously and in opposite directions in order to adjust the distance. The gap width 81 may possibly be too small to accommodate a freight unit 4 with a width 42 by only a few millimeters. On the other hand, it may be that for safety reasons, to avoid collision, a safety distance 82 is necessary between the side walls 83 of the freight unit 4 waiting to be stacked and the freight unit 4 already in the stack position or at the side between the conveyor tracks 50a, 50b and the side walls 83 of the freight units already in the stack position. The safety distance 82 is based on the fact that a customer order is not usually made up only freight units 4 with particularly dimensionally stable side walls 83 but also includes some with slightly deformable side walls 83, thereby causing sagging or misalignment of the side walls 83.

In order to stack a freight unit 4 in the gap, the conveyor tracks 50a, 50b are moved out in the z direction into the loading position indicated in FIG. 9 between the freight units 4. In the loading position, the conveyor tracks 50a, 50b are disposed apart from the possibly sagging side walls 83 in the x direction by at least the lateral safety distance 82. This is achieved by moving one or both conveyor tracks 50a, 50b in the x direction.

The relatively displaceable conveyor tracks 50a, 50b are then moved apart from one another in the x direction into an open position illustrated in FIG. 10 and the side wall 83 of the stacked freight unit(s) 4 is re-shaped as this happens. In the open position, the conveyor tracks 50a, 50b are set in the x direction to the distance 53. The distance 53 is set before a freight unit 4 is deposited alongside the stack gap by the positioning conveyor unit 16. Once a gap width 81 has been determined and compared with the width 42 of a freight unit 4, the computer system calculates the maximum distance 53 (open position) at which the freight unit 4 can still be reliably conveyed on the conveyor tracks 50a, 50b, also making allowance for the conveying properties mentioned above. The x displacement of the conveyor tracks 50a, 50b between the distance 53 set on the basis of the conveying properties and the distance 53 set on the basis of the gap width 81 is usually only a few millimeters to centimeters, which means that the freight unit 4 can be reliably conveyed on the one hand and a high packing density can be achieved in the freight stack 3 on the other hand. If there is no guaranteeing that the freight unit 4 can be reliably conveyed because the maximum distance 53 is too big, this freight unit 4 is not placed in the stack gap but in another free position in the freight stack 3.

Otherwise, gap width 81 can be made larger by up to at least the width 42 of the freight unit 4 waiting to be stacked, after which the freight unit 4 can be conveyed into the gap without collision. The conveyor tracks 50a, 50b remain in their open position until the freight unit 4 has been conveyed to the set z position. The conveyor tracks 50a, 50b are then moved towards one another in the x direction back into their loading position and moved back in the direction of the transfer position (FIG. 3) so that the freight unit 4 on the loading plane 80 (not illustrated) is deposited exactly in the z position.

Naturally, a loading pattern might also occur where a gap is created between a wall part 84 of the loading aid 9 and a freight unit 4 within a stack position. In this case, it is exclusively the conveyor track 50a, 50b adjacent to the freight units 4 which is moved into the open position and it is moved towards the side wall 83, thereby widening the gap.

Figure 11:
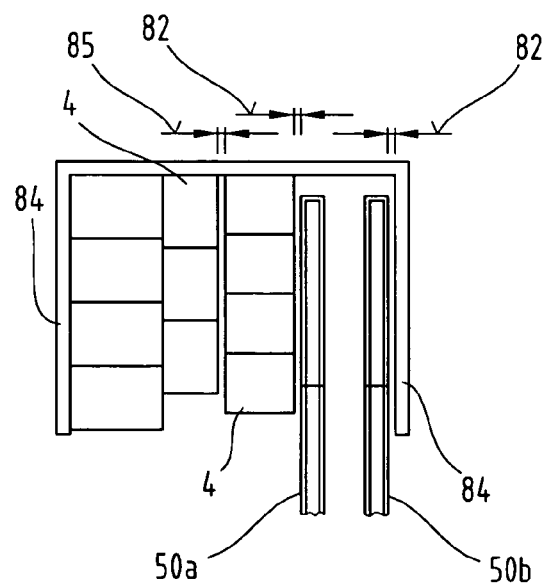
Figure 12:
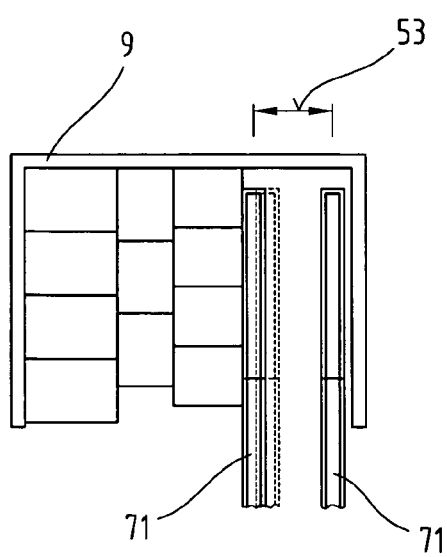

As may be seen from the loading pattern illustrated in FIGS. 11 and 12, which will described together, spacing gap 85 is created between the second and third rows of stacked freight units 4 resulting from the safety distance 82. This occurs if the freight stack 3 is built from the bottom up and every freight stack layer is assembled on the freight carrier 2 from the rear forwards and from left to right or from right to left.

In order to obtain optimised capacity usage, it is proposed that the conveyor tracks 50a, 50b be moved out in the z direction into a loading position (FIG. 11) and then the left-hand conveyor track 50a is moved into the open position (FIG. 12). As this happens, the freight units 4 of the third row are pressed against the freight units 4 of the second row and the spacing gap 85 is minimised to virtually zero. In the open position, the conveyor tracks 50a, 50b are set to the distance 53 in the x direction.

The left-hand conveyor track 50a is then moved back in the x direction into its loading position, as indicated by broken lines in FIG. 12. A freight unit 4 is then transferred from the feeding conveyor system 17 to the positioning conveyor unit 16 and conveyed by means of the conveyor means 71 to the set z position in the freight stack 3 and deposited in this position in the loading plane 80 (not indicated) in the manner described above.

In another embodiment, although this is not illustrated, in order to reduce the spacing gap 85 between freight units 4, the conveyor tracks 50a, 50b are set to the distance 53 and then moved out in the z direction with the freight unit 4 making allowance for the safety distance 82 until the freight unit 4 has reached the pre-specified z position, after which this freight unit 4 is pushed sideways by its side wall 83 against the freight unit 4 already in the stack position by a movement of the conveyor tracks 50a, 50b in the x direction.

In the embodiment described above, the distance 53 is set automatically by the computer system on the basis of at least one conveying property of the freight unit 4 and/or a stack property or a loading pattern in the freight stack 3, in particular a gap width 81 of a stack gap.

As illustrated in FIG. 13, the device 1 described above is also suitable for freight units 4 onto a freight carrier 2 manually. The consignment area 12 in which the consignment staff work is disposed between the lifting station 6 and the device 1 and the freight units 4 delivered individually alongside the positioning conveyor unit 16 by means of the conveyor tracks 50a, 50b are picked up by the illustrated staff member and placed on the freight carrier 2 or an already stacked position. A distance is advantageously set between the conveyor tracks 50a, 50b which is determined on the basis of the conveying property of the freight unit to be stacked. In the case of manual loading, it is important for the distance (not indicated) between the conveyor tracks 50a, 50b to be set so that the freight units 4 can be reliably positioned/conveyed on the conveyor tracks 50a, 50b on the one hand and the consignment operator can handle them comfortably making allowance for stringent ergonomic requirements on the other hand. Accordingly, when calculating the distance between the conveyor systems 40a, 40b and conveyor tracks 50a, 50b, in addition to or as an alternative to the conveying properties, handling properties of the freight units 4 are also taken into account, for example the ease with which a freight unit 4 placed on the conveyor tracks 50a, 50b can be picked up. During manual loading, the conveyor tracks 50a, 50b are moved exclusively in the x direction so that the consignment operator can always pick up the freight units 4 from one and the same delivery position. The conveyor tracks 50a, 50b are moved into a parked position during manual loading so that the consignment operator is able to work in the consignment area 12 unobstructed. Consignments can therefore also be handled efficiently during manual operation. The consignment operator has access to the consignment area 12 by means of a stepladder, which is disposed on a platform. The conveyor tracks 50a, 50b on which a freight unit 4 is delivered are disposed at the chest or hip height of the consignment operator.

FIGS. 14a to 14j are schematic diagrams illustrating another embodiment of the device 1 of the consignment system proposed by the invention. The device 1 for loading a freight carrier 2 with freight units 4 forming a freight stack 3 differs from the embodiment described in preceding drawings due to the fact that a distributor conveyor system 90 is additionally provided between the stationary feeding system 5 and the feeding conveyor system 17 which can be moved in the x direction. The positioning conveyor unit 16 of the device 1 is designed either separately from the feeding conveyor system 17 as was the case with the preceding embodiment but displaceable in the x direction synchronously with the feeding conveyor system 17 (coupled displacement), or is mounted on the support frame of the positioning carriage 20 of the feeding conveyor system 17 by means of a first displacement device, not illustrated, and can be displaced jointly with the latter in the x direction. By means of a second displacement device, the distance 53 can be set in the manner described above.

In the embodiment illustrated, the positioning conveyor unit 16 and feeding conveyor system 17 are moved in the x direction jointly as a single unit.

As schematically indicated in the drawings, the device 1 in turn has the orienting device 18, which comprises the lateral guides disposed parallel and at a distance apart from one another in the conveying direction 35 of the freight units 4, for example conveyor systems 40a, 40b or centring devices or similar, by means of which a freight unit 4 can be positioned on and relative to the belt conveyor 33 in the x direction and centred.

The distributor conveyor system 90 is provided in the form of a roller conveyor, belt conveyor and similar, for example, and is mounted on a base frame so that it is able to move by means of a displacement device, not illustrated, along a guide arrangement x direction between a transfer position and a hand-over position in the.

Figure 14:
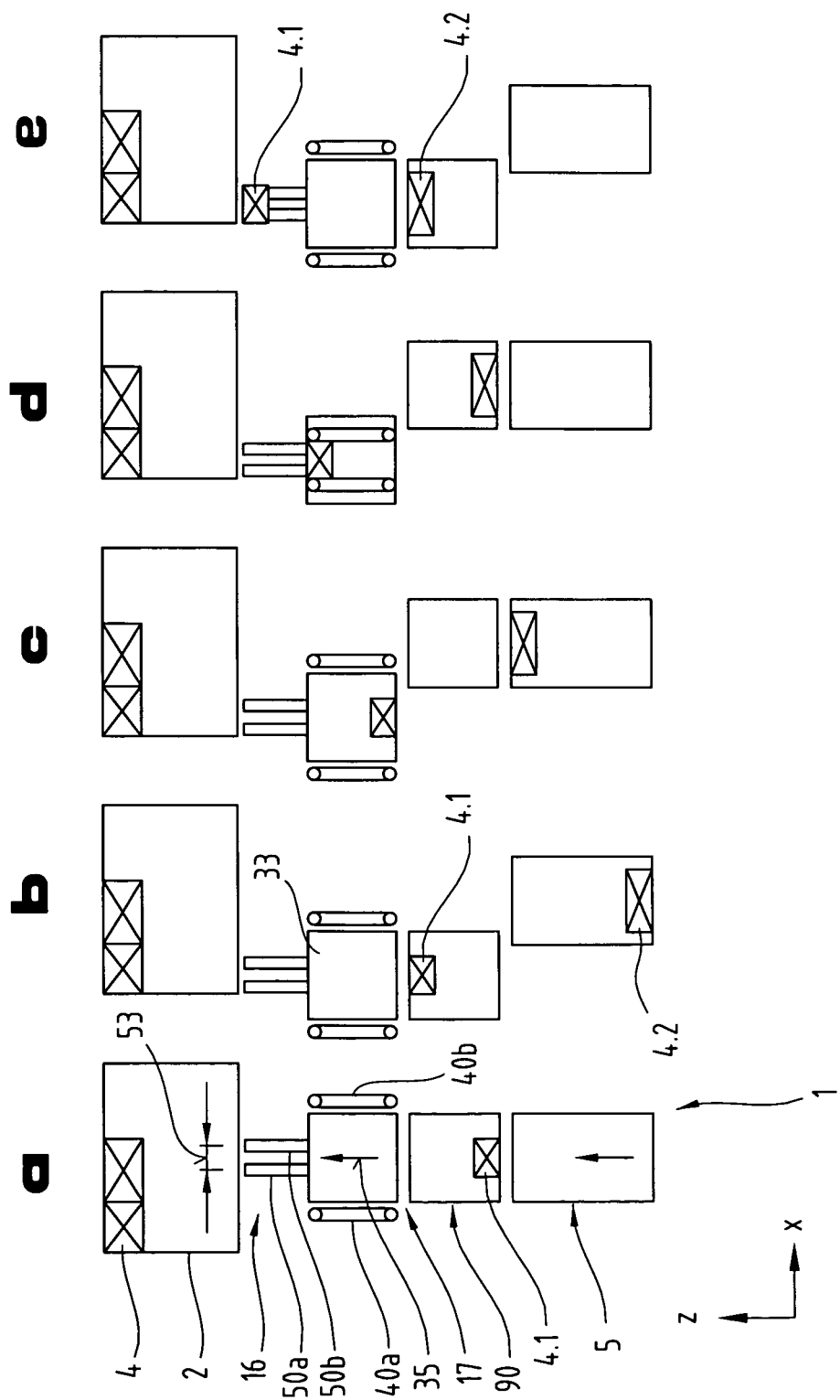

The automatic loading of the freight units 4 on the freight carrier 2 will be explained below with reference to the sequence diagrams illustrated in FIG. 14.

In FIG. 14a, the first freight unit 4.1 is conveyed from the stationary feeding system 5 to the distributor conveyor system 90, which has been moved in the x direction into the pick-up position. The distributor conveyor system 90 is then moved in the x direction into the transfer position and the first freight unit 4.1 is conveyed in the direction towards the feeding conveyor system 17 to a transfer position, as illustrated in FIG. 14b so that the first freight unit 4.1 is positioned in the x direction.

The first freight unit 4.1 is positioned in the x direction during a first loading cycle so that when the freight unit 4.1 is in the transfer position, it is already at the loading position in the freight stack 3 in the x direction set by the computer system, as illustrated in FIG. 14b. The positioning and feeding conveyor systems 16, 17 are likewise positioned in the x direction and the conveyor tracks 50a, 50b set to the distance 53 described above and are positioned underneath the feeding conveyor system 17 so that the first freight unit 4.1 can be transferred centrally relative to the conveyor tracks 50a, 50b.

As illustrated in FIGS. 14c-d, the first freight unit 4.1 is conveyed by the distributor conveyor system 90 to the feeding conveyor system 17 and preferably oriented in the x direction between the lateral guides, for example conveyor systems 40a, 40b. Once the first freight unit 4.1 has been transferred, the distributor conveyor system 90 is moved in the x direction from its transfer position into the pick-up position and picks up its second freight unit 4.2.

As illustrated in FIG. 14e, the first freight unit 4.1, having been oriented if necessary, is picked up by the positioning conveyor unit 16 which has been moved into the pick-up position.

Once the first freight unit 4.1 has been picked up by the positioning conveyor unit 16, the conveyor tracks 50a, 50b are moved in the z direction out of their pick-up position illustrated in FIG. 14e into the loading position illustrated in FIG. 14f in which the freight unit 4 lying on the conveyor means 71 is disposed above its pre-specified x and z loading position in the freight stack 3. By moving the conveyor tracks 50a, 50b in the x direction, this freight unit 4.1 can then be pushed sideways by its side wall against a wall part of a loading aid (not illustrated).

The conveyor tracks 50a, 50b together with the conveyor means 71 are then moved back in the reverse direction 79 at the same time as the conveyor means 71 on the support side are driven opposite the reverse direction 79 in the conveying direction 35 of the freight unit 4.1. The freight unit 4.1 is thus deposited on the freight carrier 2 or in a stack position in the manner described above.

The first loading cycle is terminated when the freight unit 4.1 has been deposited and the conveyor means 71 have been completely moved away from underneath the freight unit 4.1.

As may be seen from the sequence diagrams, the loading cycle of the second freight unit 4.2 is already started during the loading cycle of the first freight unit 4.1.

During the second loading cycle, a second freight unit 4.2 is firstly conveyed alongside/placed on the on the feeding system 5 and as this happens, the distributor conveyor system 90 is moved in the x direction from its transfer position illustrated in FIG. 14*b* into the pick-up position illustrated in FIG. 14*c*. In the pick-up position, the second freight unit 4.2 is conveyed by the feeding system 5 towards the distributor conveyor system 90. When the second freight unit 4.2 is disposed on the distributor conveyor system 90, the latter is moved back into the transfer position again and the second freight unit 4.2 is conveyed in the direction towards the feeding conveyor system 17 into a transfer position, as illustrated in FIG. 14*e*.

The second freight unit 4.2 is positioned in the x direction during the second loading cycle so that when the second freight unit 4.2 is in the transfer position, it is not yet in the loading position in the freight stack 3 in the x direction set by the computer. As may be seen from FIG. 14*f*, the distributor conveyor system 90 is moved in the x direction into the transfer position in which the second freight unit 4.2 is disposed in the transfer position corresponding to the loading position in the freight stack 3 in the x direction set by the computer system for the first freight unit 4.1. Accordingly, the transfer position is not dependent on the subsequent loading position of the second freight unit 4.2 in the freight stack 3 in the x direction.

As illustrated in FIG. 14*g*, the second freight unit 4.2 is transferred from the distributor conveyor system 90 to the feeding conveyor system 17 during the loading operation of the first freight unit 4.1 and hence whilst the conveyor tracks 50*a*, 50*b* are being moved out with the first freight unit 4.1 into the loading position and/or the conveyor tracks 50*a*, 50*b* are being moved into the pick-up position and depositing the first freight unit 4.1 on the loading plane.

When the second freight unit 4.2 is disposed on the feeding conveyor system 17, it is conveyed in the x direction by a movement of the feeding conveyor system 17 into the set loading position and is oriented by the lateral guides, for example conveyor systems 40*a*, 40*b*, as illustrated FIG. 14*h*. The positioning conveyor unit 16 is likewise positioned in the x direction and the conveyor tracks 50*a*, 50*b* are set to the distance 53 described above and are thus positioned underneath the feeding conveyor system 17 so that the second freight unit 4.1 can be transferred centrally relative to the conveyor tracks 50*a*, 50*b* onto the positioning conveyor unit 16 which has been moved into the pick-up position.

As may be seen from the sequence diagrams, the loading cycle of the third freight unit 4.3 is already started during the loading cycle of the second freight unit 4.2.

Having transferred the second freight unit 4.2 to the feeding conveyor system 17, the distributor conveyor system 90 is moved in the x direction from its transfer position (FIG. 14*g*) into the pick-up position (FIG. 14*h*) and picks up a third freight unit 4.3, as illustrated in FIG. 14*h*. When the third freight unit 4.3 is disposed on the distributor conveyor system 90, the latter is moved backed into the transfer position again in which the third freight unit 4.3 in is disposed in the transfer position, as illustrated in FIG. 14*i*. In this instance, the transfer position is set either on the basis of the loading position of the freight unit 4.3 currently being conveyed or the preceding freight unit 4.2 on the basis of the actual position of the feeding conveyor system 17 in the x direction.

This operation or the loading cycles are repeated until the freight stack 3 on one or freight carriers 2 has been completed to fulfil a customer order.

Since the transfer position is detected by the computer system on the basis of the loading position of the freight unit currently being conveyed or the preceding freight unit or is pre-defined on the basis of the actual position of the feeding conveyor system 17 in the x direction, the transfer position of the distributor conveyor system 90 can also be set by the computer system and the distributor conveyor system 90 moved into it.

If the transfer position for a freight unit is pre-defined on the basis of the actual position of the feeding conveyor system 17 in the x direction, the displacement path of the feeding conveyor system 17 in the x direction can be detected and the distributor conveyor system 90 can be moved relative to the feeding conveyor system 17 on the basis of the detected actual position and the freight unit moved in the x direction so that it is available in the transfer position. The displacement path is detected by means of a distance measuring system, although this is not illustrated, by means of which the actual position of the positioning carriage 20 is detected by sensors. The distance measuring system is provided in the form of a distance recorder, inductive distance recorder, magnetic distance recorder or opto-electronic distance recorder, all of a type known per se. The measuring method used is based on an absolute or incremental distance measurement.

Alternatively, the actuator motor 31 for the displacement carriage 20 may be provided with a resolver or incremental transmitter for example, which may be provided as a positioning system by means of which the actual position of the positioning carriage 20 is detected on a permanent basis.

The embodiments illustrated as examples represent possible variants of the device 1, and it should be pointed out at this stage that the invention is not specifically limited to the variants specifically illustrated, but instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of the device 1, it and its constituent parts are illustrated to a certain extent out of scale and/or on an enlarged scale and/or on a reduced scale.

LIST OF REFERENCE NUMBERS

1 Device 40*b* Conveyor system
2 Freight carrier 41*a* Driving motor
3 Freight stack 41*b* Driving motor
4 Freight unit 42 Width
5 Feeding system 43 Positioning carriage
6 Lifting station 44 Displacement device
7 Conveyor system 45 Linear guide
8 Conveyor system 46 Traction means
9 Loading aid 47 Actuator motor
10 Lifting table 48 Driving carriage
11 Freight carrier-switching unit 49
12 Consignment area 50*a* Conveyor track 13 50b Conveyor track
14 51a Guide carriage
15 51b Guide carriage
16 Positioning conveyor unit 52 Displacement device
17 Feeding conveyor system 53 Distance
18 Orienting device 54 Linear guide
19 Load monitoring system 55 Cross-member
20 Positioning carriage 56 Traction means
21 Support 57 Actuator motor
22 Support 58 Traction means
23 Support arm 59 Actuator motor
24 Displacement device 60 Displacement device
25 X direction 61
26 Base frame 62
27 Uprights 63
28 Cross-member 64
29 Linear guide 65a Traction means
30 Traction means 65b Traction means
31 Actuator motor 66 Displacement motor
32 Driving carriage 67a Coupling carriage
33 Belt conveyor 67b Coupling carriage
34 Slide ledge 68a Framework
35 Conveying direction 68b Framework
36 Conveyor motor 69a Linear guide
37 Frame 69b Linear guide
38 Cantilever 70 Extraction direction
39 71 Conveyor means
40a Conveyor system 72 Conveyor motor
73 Supporting section
74 Guiding section
75 Displacement device
76 Retaining arm
77 Actuator motor
78 Scanning device
79 Reverse direction
80 Loading plane
81 Gap width
82 Safety distance
83 Side wall
84 Wall part
85 Spacing gap
86 Side wall
90 Distributor conveyor system

The invention claimed is:

1. A consignment system, comprising:
a device for automated loading a freight carrier with freight units forming a freight stack, the freight units being of different dimensions, geometries, dimensional stability or surface properties, the device comprising:
(i) a computer system for determining first conveying properties for each of the freight units and second loading positions for each of the freight units in the freight stack, each on the basis of at least one of the dimension, geometry, dimensional stability and surface property of the freight unit,
(ii) a positioning conveyor unit for placing the freight units on the freight stack at three-dimensional loading positions set by the computer system, the positioning conveyor unit having
a first conveyor track equipped with a first conveyor means;
a second conveyor track equipped with a second conveyor means, the first and second conveyor tracks being arranged parallel to each other;
a first displacement device for adjusting the first and second conveyor tracks relative to one another in a first direction (x-direction) so as to adjust a distance between the first and second conveyor tracks on the basis of at least one of the conveying property of the freight unit to be stacked and a gap width of a stack gap in a stack position of the freight stack, wherein the distance is set automatically by the computer system on the basis of at least one conveying property of the freight unit or the gap width;
a second displacement device for adjusting the first and second conveyor tracks synchronously in a second direction (z-direction) between a retracted transfer position and an extracted loading position;
at least one conveyor motor for driving the first and second conveyor means for stacking the freight unit;
(iii) a feeding conveyor system which can be moved in the first direction (x-direction) by a third displacement device horizontally alongside the freight carrier and relative to the positioning conveyor unit; and
(iv) a lifting station for raising and lowering the freight carrier.

2. The consignment system as claimed in claim 1, wherein the conveyor tracks have conveyor means which can be moved synchronously in the second direction (z direction) towards the freight carrier relative to the feeding conveyor system by means of the second displacement device.

3. The consignment system as claimed in claim 1, wherein the device has an orienting device which positions the freight unit in the first direction (x-direction) horizontally alongside the freight carrier.

4. The consignment system as claimed in claim 3, wherein the orienting device has lateral guides which can be adjusted by means of a fourth displacement device to essentially the width of the freight unit to be stacked.

5. The consignment system as claimed in claim 4, wherein the lateral guides are provided in the form of conveyor systems which are disposed on a positioning carriage mounting the feeding conveyor system and can be activated synchronously.

6. The consignment system as claimed in claim 1, wherein the conveyor tracks project out from a front end of the feeding conveyor system in the conveying direction of the freight units and are disposed underneath it.

7. The consignment system as claimed in claim 1, wherein the conveyor tracks constitute a conveyor plane extending in a downwards incline towards their front ends in the conveying direction of the freight units.

8. The consignment system as claimed in claim 1, wherein the feeding conveyor system constitutes a conveyor plane extending in a downwards incline towards its front end in the conveying direction of the freight units.

9. The consignment system as claimed in claim 8, wherein the feeding conveyor system constitutes a transfer plane at its front end in the conveying direction of the freight units, which subtends an angle of more than 180° with the conveyor plane.

10. The consignment system as claimed in claim 1, wherein the device has a feeding system disposed upstream of the feeding conveyor system in the conveying direction of the freight units.

11. The consignment system as claimed in claim 1, wherein the device also has a distributor conveyor system which can be moved in the first direction (x-direction) horizontally alongside the freight carrier and relative to the feeding conveyor system, which is disposed between the feeding system and the feeding conveyor system in the conveying direction of the freight units.

12. The consignment system as claimed in claim 1, wherein the device has a consignment area between the lifting station and the feeding conveyor system.

13. A method of automatically loading a freight carrier with freight units forming a freight stack with a device, the freight units being of different dimensions, geometries, dimensional stability or surface properties, the device comprising:
  i) a positioning conveyor unit having
    a first conveyor track equipped with a first conveyor means;
    a second conveyor track equipped with a second conveyor means, the first and second conveyor tracks being arranged parallel to each other;
  ii) a feeding conveyor system which is configured to be movable in a first direction (x-direction) by a first displacement device horizontally alongside the freight carrier; and
  (iii) a lifting station for raising and lowering the freight carrier;
  the method for stacking freight units comprising the steps of:
  i) entering consignment orders each including a plurality of freight units,
  ii) determining first conveying properties for each of the freight units and second loading positions (x-position, y-position, z-position) for each of the freight units in the freight stack each on the basis of at least one of the dimension, geometry, dimensional stability and surface property of the freight unit by means of a computer system,
  iii) determining a distance between the first and second conveyor tracks on the basis either of the conveying property of the freight unit to be stacked or a gap width of a stack gap in a stack position of the freight stack by means of the computer system,
  iv) delivering the freight units of an order in a sequence to the feeding conveyor system,
  v) picking a first freight unit onto the feeding conveyor system and moving in the first direction (x direction) until it is disposed at the x-position determined by the computer system,
  vi) adjusting the first and second conveyor tracks relative to one another in the first direction (x-direction) by means of a second displacement device so as to adjust a distance between the first and second conveyor tracks on the basis either of the conveying property of the first freight unit to be stacked or the gap width of the stack gap in the loading position of the freight stack,
  vii) after adjusting the first and second conveyor tracks, transferring the first freight unit from the feeding conveyor system onto the first and second conveyor tracks,
  viii) extending the first and second conveyor tracks synchronously in a second direction (z-direction) between a retracted transfer position and an extracted loading position by means of a third displacement device, wherein in the retracted transfer position the first freight unit is picked up by the first and second conveyor tracks and in the extracted loading position the first freight unit is in the z-position determined by the computer system,
  ix) stacking the first freight unit in the z-position in such a manner that a conveyor plane of the conveyor means is moved opposite to a reverse direction of the first and second conveyor tracks are moved back into the retracted transfer position, as a result of which the freight unit is transferred to the set loading position without any displacement relative to the conveyor plane,
  x) picking the second freight unit onto the feeding conveyor system and moving the feeding conveyor in the first direction (x-direction) until the second freight unit is disposed at the x-position determined by the computer system,
  xi) adjusting the first and second conveyor tracks relative to one another in the first direction (x-direction) by means of the second displacement device so as to adjust the distance between the first and second conveyor tracks on the basis of either the conveying property of the second freight unit to be stacked or the gap width of the stack gap in the loading position of the freight stack,
  xii) after adjusting the first and second conveyor tracks, transferring the second freight unit from the feeding conveyor system onto the first and second conveyor tracks,
  xiii) extending the first and second conveyor tracks synchronously in the second direction (z-direction) between the retracted transfer position and an extracted loading position by means of a third displacement device, wherein in the retracted transfer position the second freight unit is picked up by the first and second conveyor tracks and in the extracted loading position, the second freight unit is in the z-position determined by the computer system, and
  xiv) stacking the second freight unit in the z-position in such a manner that the conveyor plane of the conveyor means is moved opposite to the reverse direction of the conveyor tracks are moved back into the retracted transfer position, as a result of which the freight unit is transferred to the set loading position without any displacement relative to the conveyor plane.

14. A method of positioning freight units forming a freight stack on a freight carrier with a device in a consignment system, the freight units being of different dimensions, geometries, dimensional stability or surface properties and the device comprising:
  i) a positioning conveyor unit having
    a first conveyor track,
    a second conveyor track, the first and second conveyor tracks are arranged parallel to each other;
  ii) a feeding conveyor system which is configured to be movable in a first direction (x-direction) by a first displacement device horizontally alongside the freight carrier and relative to the positioning conveyor unit; and
  iii) a lifting station for raising and lowering the freight carrier;
  the method for stacking freight units comprising the steps of:
  i) entering consignment orders each including a plurality of freight units,
  ii) determining conveying properties for each of the freight units on the basis of at least one of the dimension, geometry, dimensional stability and surface property of the freight unit by means of a computer system,
  iii) determining a distance between the first and second conveyor tracks on the basis of the conveying property of the freight unit to be stacked by means of the computer system,
  iv) delivering the freight units of an order to the feeding conveyor system,
  v) picking a first freight unit onto the feeding conveyor system,
  vi) before the first freight unit is transferred from the feeding conveyor system onto the positioning conveyor unit, the freight unit is moved in the first direction (x-direction) horizontally alongside the freight carrier and relative to the positioning conveyor unit by the feeding conveyor system, and the positioning conveyor unit is moved to a park position and remains in that position, and the first and second conveyor tracks of the positioning conveyor unit are adjusted relative to one another in the first direction (x-direction) by means of a second displacement device so as to adjust the distance between the first and second conveyor tracks on the basis of the conveying property of the first freight unit to be stacked, vii) after adjusting the first and second conveyor tracks, transferring the first freight unit from the feeding conveyor system to a standby position on the first and second conveyor tracks, and picking the first freight unit from the first and second conveyor tracks by a staff member and placing on the freight carrier or an already stacked freight unit, viii) and afterwards picking a second freight unit onto the feeding conveyor system, ix) before the second freight unit is transferred from the feeding conveyor system onto the positioning conveyor unit, the second freight unit is moved in the first direction (x-direction) horizontally alongside the freight carrier and relative to the positioning conveyor unit by the feeding conveyor system, and the first and second conveyor tracks of the positioning conveyor unit are adjusted relative to one another in the direction (x-direction) by the second displacement device so as to adjust the distance between the first and second conveyor tracks on the basis of the conveying property of the second freight unit to be stacked, x) after adjusting the first and second conveyor tracks, transferring the second freight unit from the feeding conveyor system to the stand-by position on the first and second conveyor tracks, and picking the second freight unit from the first and second conveyor tracks by the staff member and placing on the freight carrier or an already stacked freight unit.

15. The method as claimed in claim 13, further comprising before transferring a freight unit to the positioning conveyor unit, positioning the freight unit between lateral guides of an orienting device which can be moved relative to one another.

16. The method as claimed in claim 13, further comprising during loading of the freight carrier, moving the conveyor tracks to a position above the loading position for the freight unit and then moving at least one conveyor track in the x-direction horizontally alongside the freight carrier and relative to the freight carrier, during which pushing of a freight unit already disposed on the freight carrier against a side wall occurs then moving a freight unit and depositing the freight unit at the loading position.

17. The method as claimed in claim 16, further comprising before depositing the freight unit already moved to the loading position, moving the conveyor track in the x-direction away from the side wall of a freight unit already disposed on the freight carrier and then moving both conveyor tracks back in the z direction and simultaneously depositing the freight unit.

18. The method as claimed in claim 16, further comprising whilst moving the two conveyor tracks back in the z-direction, sliding the conveyor track which has been moved in the x-direction against a side wall of a freight unit already disposed on the freight carrier along the side wall and simultaneously depositing the freight unit.

19. The method as claimed in claim 13, further comprising after transferring the first freight unit to the feeding conveyor system and conveying the first freight unit by the feeding conveyor system to a set loading position in the freight stack, moving the second freight unit by a distributor conveyor system relative to the feeding conveyor system into a transfer position.

20. The method as claimed in claim 19, further comprising moving the freight unit by the distributor conveyor system into the transfer position corresponding to the loading position in the freight stack in the x direction set by the computer system.

21. The method as claimed in claim 19, further comprising moving the freight unit by the distributor conveyor system into the transfer position corresponding to the loading position in the freight stack in the x direction set by the computer system for the freight unit of the preceding loading cycle.

22. The method as claimed in claim 19, further comprising detecting the displacement path of the feeding conveyor system in the x direction and moving, on the basis of the detected displacement path, the distributor conveyor system relative to the feeding conveyor system into the transfer position, positioning the freight unit in the x-direction in the transfer position.

23. The method as claimed in claim 14, further comprising before transferring a freight unit to the positioning conveyor unit, positioning the freight unit between lateral guides of an orienting device which can be moved relative to one another.

* * * * *